United States Patent
Murai et al.

(10) Patent No.: US 12,344,235 B2
(45) Date of Patent: Jul. 1, 2025

(54) PARKING SUPPORT APPARATUS AND PARKING SUPPORT METHOD

(71) Applicant: Panasonic Intellectual Property Management Co., Ltd., Osaka (JP)

(72) Inventors: Akihito Murai, Kanagawa (JP); Yoshimasa Okabe, Kanagawa (JP); Hirofumi Nishimura, Kanagawa (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 103 days.

(21) Appl. No.: 18/382,394

(22) Filed: Oct. 20, 2023

(65) Prior Publication Data

US 2024/0140401 A1    May 2, 2024

(30) Foreign Application Priority Data

Oct. 28, 2022    (JP) .............................. 2022-173350
Jul. 27, 2023    (JP) .............................. 2023-122398

(51) Int. Cl.
    *B60Q 1/48*     (2006.01)
    *B60W 30/06*     (2006.01)
    (Continued)

(52) U.S. Cl.
    CPC .......... *B60W 30/06* (2013.01); *B60W 40/105* (2013.01); *B60W 50/14* (2013.01);
    (Continued)

(58) Field of Classification Search
    CPC ........ H02K 11/26; H02K 11/25; G06F 3/016; B60W 30/06; B60W 40/105; B60W 50/14; B60W 2050/143; B60W 2050/146; B60W 2420/403; B60W 2540/223; B60W 2552/53; B60W 2556/10;
    (Continued)

(56) References Cited

U.S. PATENT DOCUMENTS 9,944,282 B1 *    4/2018   Fields ................ G01C 21/3407
11,810,368 B2 *   11/2023  Hiei ..................... B60W 30/06
(Continued)

FOREIGN PATENT DOCUMENTS

JP    2008-201363    9/2008
JP    2019-073191    5/2019
(Continued)

OTHER PUBLICATIONS

English language translation of Office Action from Japan Patent Office (JPO) in Japanese Patent Appl. No. 2013-122398, dated Jul. 16, 2024.

*Primary Examiner* — Toan N Pham
(74) *Attorney, Agent, or Firm* — Greenblum & Bernstein, P.L.C.

(57) ABSTRACT

A parking support apparatus includes an instruction detection section that detects the occupant's parking instruction based on an operation of the occupant of the vehicle or a history of a motion of the vehicle, and a vehicle control section that performs the automatic parking of the vehicle. When the history indicates that the vehicle has stopped after steering and turning from a straight movement, and that the occupant has performed a predetermined parking instruction operation, the instruction detection section determines that the parking instruction is detected.

20 Claims, 18 Drawing Sheets

(51) Int. Cl.
  *B60W 40/105* (2012.01)
  *B60W 50/14* (2020.01)
  *G06V 20/56* (2022.01)
  *G06V 20/58* (2022.01)
  *G08G 1/14* (2006.01)
(52) U.S. Cl.
  CPC .......... *G06V 20/586* (2022.01); *G06V 20/588* (2022.01); *B60W 2050/143* (2013.01); *B60W 2050/146* (2013.01); *B60W 2420/403* (2013.01); *B60W 2540/223* (2020.02); *B60W 2552/53* (2020.02); *B60W 2556/10* (2020.02)
(58) Field of Classification Search
  CPC ....... B60W 2540/215; B60W 2520/06; B60W 2520/10; B60W 2520/14; B60W 2540/12; B60W 2540/16; B60W 2540/18; B60W 2540/20; G06V 20/586; G06V 20/588
  See application file for complete search history.

(56) References Cited

U.S. PATENT DOCUMENTS

| | | |
|---|---|---|
| 2010/0049401 A1 | 2/2010 | Watanabe et al. |
| 2015/0258989 A1 | 9/2015 | Okano et al. |
| 2018/0037262 A1* | 2/2018 | Imai ..................... G05D 1/0055 |
| 2023/0254450 A1 | 8/2023 | Michiguchi et al. |
| 2024/0400039 A1* | 12/2024 | Seno ..................... B60W 50/10 |
| 2025/0006055 A1* | 1/2025 | Hu ....................... B62D 15/027 |

FOREIGN PATENT DOCUMENTS

| | | |
|---|---|---|
| JP | 2019-104336 | 6/2019 |
| JP | 2022-069161 | 5/2022 |
| WO | 2014/073193 | 5/2014 |

* cited by examiner

PARKING SUPPORT APPARATUS AND PARKING SUPPORT METHOD

TECHNICAL FIELD

The present disclosure relates to a parking support apparatus and a parking support method.

BACKGROUND ART

In the related art, a parking support apparatus is known that can perform automatic parking of a vehicle in a parking slot by steering the vehicle at a certain position in a region around the parking slot, and moving it backward from a position turned at a predetermined angle. For example, PTL 1 discloses a configuration of activating a parking support apparatus with a vehicle laterally set to a parking slot, and uniquely determining the parking position of the vehicle in the parking slot.

CITATION LIST

Patent Literature

PTL 1
JP 2022-69161 A

SUMMARY OF INVENTION

Technical Problem

Solution to Problem

A parking support apparatus according to the present disclosure includes: a processor configured to detect a parking slot based on a surrounding image indicating surroundings of a vehicle; and a storage section configured to store a history of either an operation of an occupant of the vehicle or a motion of the vehicle. The processor detects a parking instruction of the occupant based on the history. The processor performs automatic parking of the vehicle after the parking instruction is detected. When the history indicates that the vehicle has stopped after steering and turning from a straight movement, and that the occupant has performed a predetermined parking instruction operation, the processor determines that the parking instruction is detected.

A parking support method according to the present disclosure includes: detecting a parking slot based on a surrounding image indicating surroundings of the vehicle; storing a history of either an operation of an occupant of the vehicle or a motion of the vehicle, detecting a parking instruction of the occupant based on the history, performing automatic parking of the vehicle after the parking instruction is detected, and determining that the parking instruction is detected when the history indicates that the vehicle has stopped after steering and turning from a straight movement, and that the occupant has performed a predetermined parking instruction operation in the detecting the parking instruction.

Advantageous Effects of Invention

According to the present disclosure, the automatic parking can be smoothly performed in a short time.

DESCRIPTION OF EMBODIMENTS

First Embodiment

Figure 1:
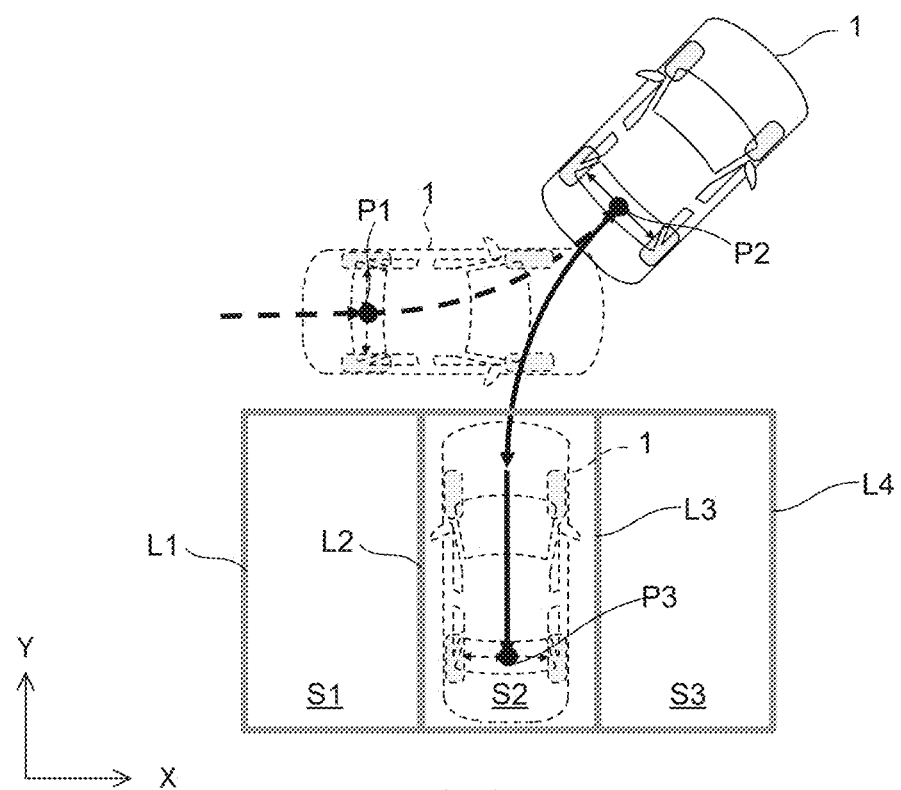
FIG. 1 is a diagram for describing automatic parking with a vehicle to which a parking support apparatus according to a first embodiment of the present disclosure is applied.
Figure 2:
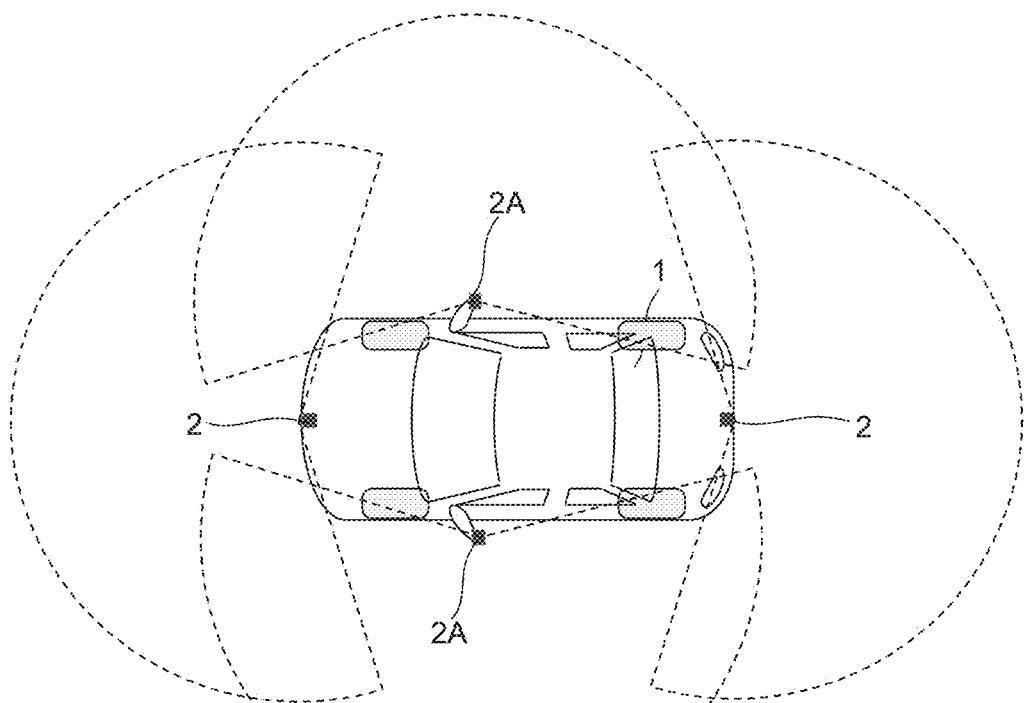
FIG. 2 is a diagram illustrating a vehicle to which the parking support apparatus according to the embodiment is applicable.

A first embodiment of the present disclosure is elaborated below with reference to the drawings. FIG. 1 is a diagram for describing automatic parking with vehicle 1 to which parking support apparatus 100 according to the first embodiment of the present disclosure is applied. FIG. 2 is a diagram illustrating vehicle 1 to which parking support apparatus 100 according to the present embodiment is applicable. Note that in the illustration of FIG. 1 and the like, an orthogonal coordinate system (X, Y) is used. The drawings described later are also illustrated with the common orthogonal coordinate system (X, Y). For example, the X direction indicates the left-right direction with respect to the parking position (the position of vehicle 1 in the parking slot), and the Y direction indicates the front-rear direction with respect to the parking position. In addition, basically, the position of vehicle 1 is represented by a representative point of vehicle 1. The representative point of vehicle 1 is a middle point of the grounded points of two rear wheels. In addition, a movement trajectory of vehicle 1 is represented by a trajectory of the representative point of vehicle 1.

Figure 3:
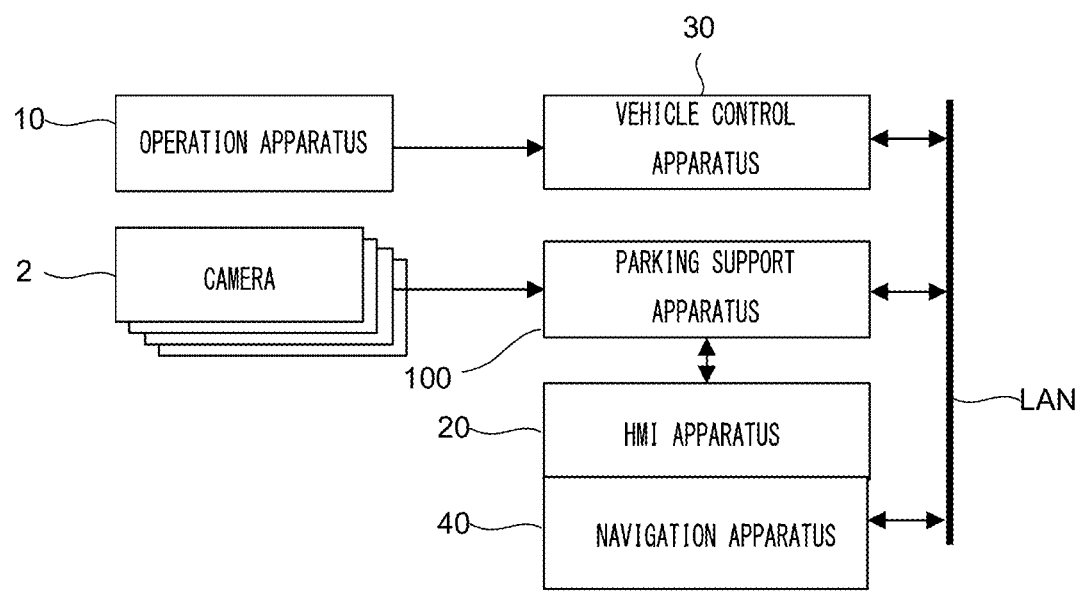
FIG. 3 is a diagram illustrating a configuration on a network of a system to which the parking support apparatus is applied.

As illustrated in FIG. 1, vehicle 1 includes camera 2 for monitoring surroundings of the vehicle (see FIG. 2 and the like), and is configured to be able to perform automatic parking in a parking lot with one or more parking slots with parking support apparatus 100 illustrated in FIG. 3. The parking slot is a region between two parking slot lines approximately parallel to each other. Parking slot lines are disposed at an interval greater than the width of vehicle 1.

The example illustrated in FIG. 1 is a parking lot in which three parking slots S1, S2 and S3 are disposed in this order from the −side in the X direction. Parking slot S1 is a parking slot between parking slot lines L1 and L2, parking slot S2 is a parking slot between parking slot lines L2 and L3, and parking slot S3 is a parking slot between parking slot lines L3 and L4. With respect to the line parallel to parking slot lines L2 and L3 with the same distance from both parking slot lines L2 and L3, the left side is the −side in the X direction, and the right side is the +side in the X direction. The +−boundary line in the Y direction is the side closer to vehicle 1 of the short sides of the parking slot.

Here, an exemplary case where vehicle 1 performs automatic parking to parking slot S2 is described. First, vehicle 1 moves straight in the direction from the −side to the +side in the X direction in a region on the +side than the three parking slots S1, S2 and S3 in the Y direction. Of parking slot lines L2 and L3 of parking slot S2, vehicle 1 moving straight steers at position P1 on the near side of parking slot line L2 located on the −side in the X direction, turns while moving forward to the +side in the Y direction, and stops at position P2. Position P2 is a position on the +side in the X direction than parking slot line L3, and the +side in the Y direction, where vehicle 1 can park between parking slot lines L2 and L3 by turning and moving backward from position P2. Vehicle 1 moves to position P2 through manual operation by the occupant.

Then, vehicle 1 performs the automatic parking when the occupant performs a parking instruction operation such as putting the gear in R (reverse). Vehicle 1 turns and moves backward from position P2 so as to enter parking slot S2 and stop at position P3 in parking slot S2. During the automatic parking, the hazard lamp may be turned on. In addition, which parking slot will be used for the parking can be determined from the position and direction of the steering, and therefore the occupant does not need to instruct the parking position during the automatic parking. The following description assumes that vehicle 1 performs the above-mentioned behavior during the automatic parking.

As illustrated in FIG. 2, vehicle 1 is provided with cameras 2 at four locations, i.e., front, rear, left and right, in the vehicle body. Each camera 2 includes a fish eye lens, and has a field of view range of 180 degrees or more in the horizontal direction (see the broken line). Each camera 2 is mounted with a depression angle for capturing the road surface, and thus one camera 2 captures the road surface of a range of about 240 degrees when the range where the road surface is captured is converted to the field of view in the horizontal direction. For example, the front wheel, the rear wheel, and the side surfaces of the vehicle body are captured in the images captured by side cameras 2A provided on the left and right sides of the vehicle body.

In addition, as illustrated in FIG. 3, vehicle 1 includes, in addition to four cameras 2, operation apparatus 10, HMI (human machine interface) apparatus 20, vehicle control apparatus 30, and parking support apparatus 100. Operation apparatus 10 is configured to be manually operated by the driver (the occupant), and includes a physical switch on a panel of the driver's seat, a switch of a software form displayed on the touch panel, and devices for the driving operation such as a steering wheel, a pedal and a gear. HMI apparatus 20 is used as an HMI for the occupant to perform input operation to parking support apparatus 100, such as a touch panel equipped in navigation apparatus 40 provided in vehicle 1, for example. The touch panel may be included in operation apparatus 10, and various switches grounded to the driver's seat may also be included in operation apparatus 10. As such, operation apparatus 10 and HMI apparatus 20 may overlap.

Vehicle control apparatus 30 includes a central processing unit (CPU), a read only memory (ROM), a random access memory (RAM), and an input and output circuit not illustrated in the drawing. When the occupant operates operation apparatus 10, vehicle control apparatus 30 receives the operation. In a typical operation mode, when vehicle control apparatus 30 drives the motor (not illustrated in the drawing) in accordance with the operation information, the operation information and vehicle information such as the steering angle and the vehicle speed are output to the LAN (Local Area Network: such as a LAN inside a vehicle) while controlling the steering angle and the vehicle speed. When a parking support mode is set, vehicle control apparatus 30 receives a command of the speed and the steering angle from parking support apparatus 100 via the LAN, and controls the speed and the steering angle in accordance with the command.

Since vehicle control apparatus 30 monitors the operation of operation apparatus 10, parking support apparatus 100 acquires operation information of operation apparatus 10 via the LAN. The occupant can operate parking support apparatus 100 through HMI apparatus 20. Parking support apparatus 100 may receive the location information of vehicle 1 output by navigation apparatus 40 via the LAN, or directly acquire it from navigation apparatus 40. Camera 2 outputs captured images to parking support apparatus 100 at all times, and parking support apparatus 100 generates display images of the surroundings of the vehicle from the captured images and outputs the display images even when not supporting the parking. In addition, since the above-mentioned touch panel also functions as a display that outputs the display image generated by parking support apparatus 100, parking support apparatus 100 and HMI apparatus 20 are directly connected. Parking support apparatus 100 may directly receive the operation information performed on the touch panel, or may receive it via the LAN. In addition, parking support apparatus 100 can receive via the LAN the location information of vehicle 1 output by navigation apparatus 40.

Figure 4:
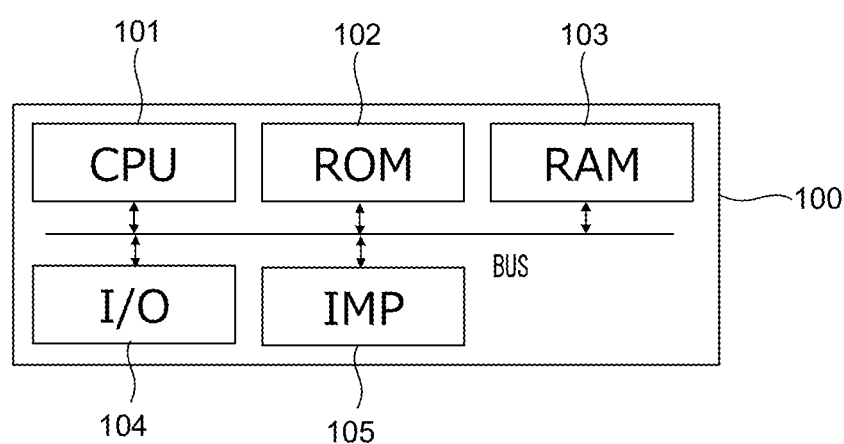
FIG. 4 is a block diagram illustrating hardware equipped with a function of the parking support apparatus.

In addition, the function of parking support apparatus 100 may be mounted in the hardware illustrated in FIG. 4. Parking support apparatus 100 includes CPU 101, ROM 102, RAM 103, I/O (input and output interface) 104 and IMP (Image Processor) 105. Parking support apparatus 100 may be a computer in which elements are connected via buses. In addition, a plurality of elements may be housed in one chip, and one element may be composed of a plurality of chips. The bus may be a combination of buses of multiple types rather than a single bus. For example, CPU 101, ROM 102, RAM 103 and IMP 105 housed in one chip may be connected via a parallel bus, and I/O 104 composed of a plurality of chips may be connected via a serial bus with a chip that houses CPU 101 and the like.

CPU 101 controls the entire parking support apparatus 100. ROM 102 is an electrically rewritable memory that stores the program executed by CPU 101 and functions also as a nonvolatile data storage region to retain data and the like even when the power of parking support apparatus 100 is turned off. RAM 103 is used for a temporary storage as a working area of CPU 101. For example, data that only needs to be stored temporarily, such as newest surrounding images, is stored in RAM 103. RAM 103 has a capacity capable of storing a plurality of surrounding images. IMP 105 is a processor specialized in image processing with an increased processing capacity, and executes processes of image acquiring section 130, parking slot detection section 140, and display image output section 180 illustrated in FIG. 5.

Figure 5:
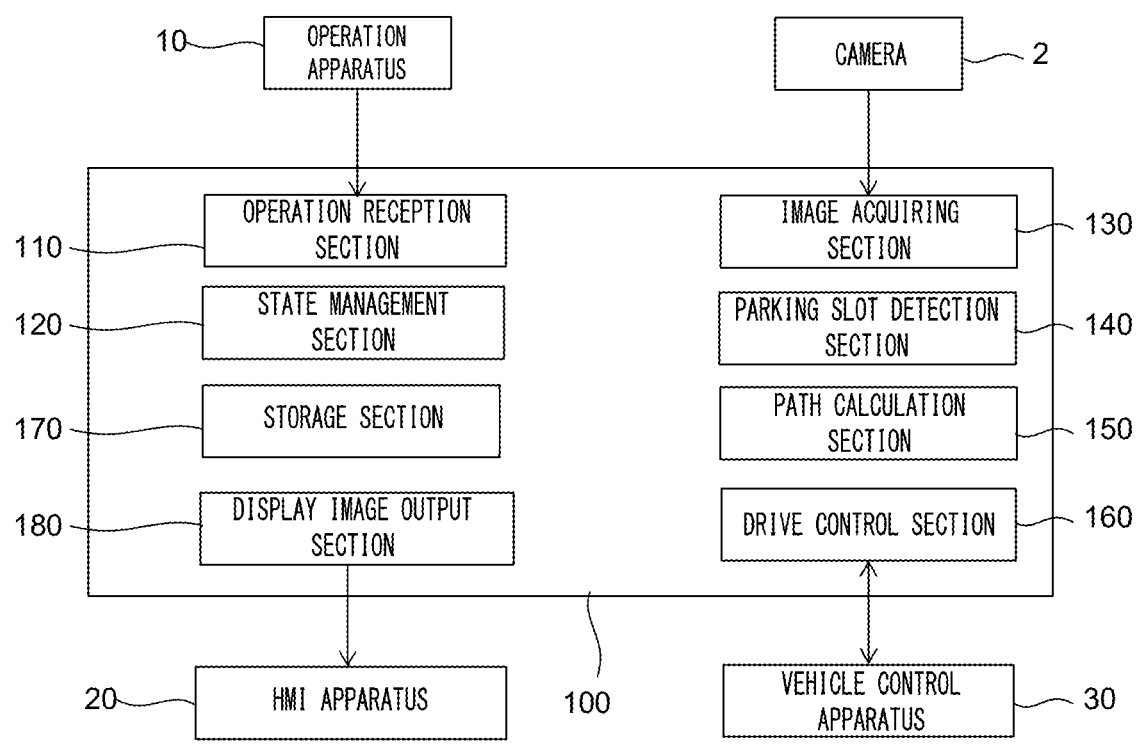
FIG. 5 is a block diagram illustrating the parking support apparatus.

The above-described camera 2 outputs captured camera images to parking support apparatus 100 at all times. Parking support apparatus 100 generates the display image indicating the region around vehicle 1 from the camera image and outputs the display image even when not supporting the parking. As illustrated in FIG. 5, parking support apparatus 100 includes operation reception section 110, state management section 120, image acquiring section 130, parking slot detection section 140, path calculation section 150, drive control section 160, storage section 170, and display image output section 180.

Operation reception section 110 receives operation information representing the occupant's operation including the driving operation.

State management section 120 manages the state of the parking support in accordance with the operation information and the state of the vehicle. The state of the parking support includes a plurality of states, e.g., state 0 to state 8.

State 0 is an initial state, where the parking support function is not activated. State 1 is a quiescent state, where when the vehicle speed information and the location information are acquired and the vehicle speed is lowered to a speed equal to or smaller than the threshold value, whether the own vehicle position is located on the road is determined. The road is a road on the map, such as public roads that are not parking lots where parking slots are disposed, for example.

State 2 is a monitoring state, where white line detection is executed at a low frequency. State 3 is a preparation state, where the captured image is recorded in linkage with time information. State 4 is a detection state, where speculative parking slot detection is executed. State 5 is a calculation state, where when the vehicle stops by turning 30 degrees or more, the speculative parking path calculation is executed, and the occupant is inquired about whether to perform parking.

State 6 is an inquiry state, where a parking path is displayed and it waits for a parking instruction operation. State 7 is a self-driving state, where the automatic parking is provided in accordance with the calculated path. State 8 is a completed state, where the completion of the automatic parking is notified.

Image acquiring section 130 acquires the camera image and generates the surrounding image of the region around vehicle 1. The surrounding image may be a bird's-eye view obtained by projecting the camera image on the road surface, or images of another format, or, the camera image as it is. In the present embodiment, the surrounding image is a bird's-eye view.

Parking slot detection section 140 sets a parking slot detection region for detecting the parking slot in the surrounding image, and extracts a white line from the surrounding image in the parking slot detection region. The parking slot detection region may be a region of the entirety of the surrounding image, or a region expected as the parking slot in the surrounding image. By limiting the parking slot detection region to the region expected as the parking slot, the processing time required for the detection can be shortened. In addition, by limiting the size of the parking slot detection region to a size larger than one parking slot but smaller than two parking slots, the processing for a case where two parking slots are simultaneously detected can be omitted. In general, a detection is performed to obtain information about a specific object, and when there is a specific object in the detection, it is determined as "detected" and information about the detected object is output. The detection result is divided into two cases: detection and non-detection. In the case of the non-detection, the purpose of the detection is not achieved. In the case where there is a detection, the purpose of the detection object is achieved. Therefore, the fact that there is a detection may be referred to as a successful detection.

Parking slot detection section 140 further generates pairs of extracted white lines, and searches for a pair that matches the condition of the parking slot from among the pairs of white lines. For example, when a pair of white lines is detected from the surrounding image and the following three conditions are satisfied, parking slot detection section 140 determines that a region where vehicle 1 can be parked (i.e., a parking slot) is detected as the region sandwiched between the two white lines. The three conditions are that the two white lines are parallel to each other on the road surface, that the two white lines are longer than the vehicle length, and that the interval of the two white lines is greater than the vehicle width. It can be said that when a parking slot is detected, the white line making up the parking slot is a parking slot line. Parking slot detection section 140 outputs the endpoints of the two parking slot lines, i.e., the coordinates of the four corners of the parking slot. The coordinates are relative coordinates with respect to the host vehicle.

Path calculation section 150 sets the target parking position such that the center of the vehicle body is set at the center of the coordinates of the four corners of the parking available region output by parking slot detection section 140, and sets the target parking angle (the orientation of the vehicle body when it is parked at the target parking position) such that the angle is parallel to the long sides of the parking available region, thereby calculating the parking path to the target parking position. Publicly known methods may be applied for the parking path calculation.

Drive control section 160 controls the steering angle and the vehicle speed such that vehicle 1 drives along the calculated parking path. More specifically, drive control section 160 outputs, to vehicle control apparatus 30, instruction values of the steering angle and the vehicle speed corresponding to the target values of the steering angle and the vehicle speed. Drive control section 160 calculates measured values of the steering angle and the vehicle speed on the basis of the data output by vehicle control apparatus 30. For example, the measured value of the vehicle speed is calculated from data about the rotational frequency of the wheel and data about the circumference length of the wheel. The measured value of the steering angle may be data obtained from steering apparatus, or may be calculated from the inner wheel difference calculated from the difference of the rotational frequency of the wheel. When there is a difference between the target value and the measured value, drive control section 160 corrects the instruction values of the steering angle and the vehicle speed such that the measured values of the steering angle and the vehicle speed are the same as the target values of the steering angle and the vehicle speed.

Drive control section 160 tracks the position and orientation of driving vehicle 1 on the basis the measured values of the calculated steering angle and vehicle speed. That is, drive control section 160 calculates the driving trajectory of vehicle 1 during automatic driving or manual driving. The driving trajectory may be calculated in a format of movement information in which the movement length, the movement direction and the angle of the vehicle body are added to the time for each unit time. The format of the movement information is not limited to this, and may be a format using coordinate information, for example.

During automatic driving, drive control section 160 compares the parking path calculated by path calculation section 150 with the driving trajectory represented by the movement information, and corrects the steering angle such that the driving trajectory follows the parking path. For example, when vehicle 1 moves back while turning at a steering angle, and the driving trajectory is outside the parking path as viewed from the turning center point, drive control section 160 increases the steering angle to reduce the rotation radius. In this manner, the driving trajectory of vehicle 1 is set back toward the parking path.

Storage section 170 stores, in the history information region, the operation information acquired by operation reception section 110, the movement information calculated by drive control section 160, the surrounding image generated by image acquiring section 130, the location information of the parking slot line and the parking slot detected by parking slot detection section 140, and the like in a time-series manner in linkage with time. Since vehicle 1 moves in accordance with the occupant's operation, one of the movement information and the operation information may not be stored in storage section 170, but in the present embodiment, both the movement information and the operation information are stored in storage section 170.

Storage section 170 may add information for each unit time, and fix the size of the storage region (memory block size) assigned to each addition. In this manner, the history information region is divided into memory blocks, and the start address of information monotonically increases for each unit time, and thus, the time is linked to the address for storing the information. Alternatively, storage section 170 may separately provide a first address table for linking the first address to the time without fixing the memory size, so as to update the first address table for each addition of information.

The newest information at that time point is accessible by specifying the time by any methods. In addition, by adding up the movement information up to that time point, the relative positional relationship of the position at that time point with respect to the present position can be specified. Conversely, by adding the location information in a time-series manner as history information, the relative positional relationship with respect to the present position may be specified on the basis of the difference between the location information at that time point and the present position. That is, the location information may be calculated from the history information.

In addition, for data with a large size such as surrounding image, it suffices to only store the first address in the history information region.

Since it suffices to refer to the history information backward by a predetermined time period, the old history information that is no longer needed may be deleted from storage section 170. For example, it is preferable to set the history information region as a fixed region between the first address and the final address in storage section 170 such that when the address where the information is stored reaches the final address, the storage is continued at the first address as a loop memory. In this manner, the past history information of one previous loop is overwritten and deleted, thus eliminating the need for the deletion process.

It is not necessary to perform the storage in the history information region at all times, as long as it is performed in state 2 to state 7.

In addition, storage section 170 stores the parking path calculated by path calculation section 150 such that drive control section 160 can refer to the parking path.

In addition, the process of the parking slot detection is time consuming, and as such in some situation parking slot information as a detection result is obtained at a time largely delayed from the image-capturing time of the camera image. Even in such a case, the parking slot information is stored in linkage with the image-capturing time in storage section 170. For example, by performing the addition of the information in storage section 170 for each unit time and fixing the capacity (memory block size) of the storage region assigned to each addition, the memory block is assigned in a fixed manner regardless of the amount of the data to be written in each addition. In the case where at the time of adding information in storage section 170, the start address of the surrounding image is obtained but the result of detection of the parking slot (parking slot information) in the surrounding image is not obtained at that time point, parking support apparatus 100 writes obtained information alone in the memory block without waiting for the parking slot information, and, when the parking slot information is obtained, parking support apparatus 100 writes the parking slot information in the memory block where the start address of the surrounding image subjected to the detection is written.

For example, in the case where steering is performed in state 3, and speculative parking slot detection is executed at the time of state 4, whether the parking slot information has been obtained at the time of state 5 changes depending on the relationship between the time period from the steering to stop of vehicle 1 and the time period required for parking slot detection. For example, in the case where the parking slot information has not been written in the corresponding memory block at the time of state 5, the process of starting the path calculation may be a waiting loop that polls the address where the parking slot information is written, or a processor (e.g., IMP) for performing the parking slot detection may be set to generate an interrupt upon completion of the parking slot detection. In this manner, the path calculation can be immediately started upon completion of the parking slot detection. As described above, by storing the parking slot information and the like in linkage with the image-capturing time in storage section 170, the automatic parking process can be efficiently controlled.

Display image output section 180 generates the display image based on the camera image or the surrounding image. The display image may be a bird's-eye view image of the region around vehicle 1 from above. That is, display image output section 180 may output a bird's-eye view as a display image.

Display image output section 180 displays messages and diagrams on the display image in a superimposed manner at the request of state management section 120. For example, when starting the automatic parking, display image output section 180 may display, in a superimposed manner on the bird's-eye view, a semi-transmissive rectangular indicating the position of the parking slot detected by parking slot detection section 140, and display, as a dotted line, the path from the host vehicle to the target parking position calculated by path calculation section 150.

The message may be read with voice in addition to the display on the image. Alternatively, the message may be output with voice alone. More specifically, state management section 120 designates one predetermined text and makes a command to output it. In response to the command, display image output section 180 generates a character string image corresponding to the designated text, and outputs, to HMI apparatus 20, the character string superimposed on the display image. At the same time, display image output section 180 outputs, to HMI apparatus 20, voice data stored with the text, together with the display image. In this manner, the occupant can receive the message without viewing HMI apparatus 20.

Next, the state managed by state management section 120 is described in detail. As described above, state management section 120 receives the occupant's operation, and manages the state of the parking support. The occupant's operation is not limited to the operation of parking support apparatus 100, but includes operations for driving. For example, when the occupant activates vehicle 1 by IG (Ignition)-ON, parking support apparatus 100 is also activated in the activation sequence of vehicle 1, and the state proceeds from state 0 (initial state) to state 1 (quiescent state).

In state 1 (quiescent state), only state management section 120 and drive control section 160 operate. State management section 120 acquires the vehicle speed information through drive control section 160, and, when the vehicle speed is reduced to a speed equal to or lower than a threshold value (e.g., 10 km/h), state management section 120 inquires navigation apparatus 40 about whether vehicle 1 is located on the road. In view of this, when vehicle 1 is located outside the road (e.g., in the premise of a store), state management section 120 advances the state to state 2. State 1 may be referred to as road driving scene. Since states correspond to scenes, state management section 120 may be referred to as an example of the scene determination section described later. In addition, state management section 120 partially or entirely limits the function of the parking slot detection section and the like in accordance with the state (scene), and therefore may be referred to as an example of the function limitation section.

In state 2 (monitoring state), a part of parking slot detection section 140 also operates. In other words, the execution of all functions of parking slot detection section 140 is limited in state 1 (road driving scene). Parking slot detection section 140 executes the line detection periodically (e.g., at one second intervals). The white line detection is executed by releasing the limitation on a part of the function of parking slot detection section 140, without executing other functions such as determination whether the white line is the parking slot line. In the captured image of the region around vehicle 1, parking slot detection section 140 detects a white line within a predetermined angle range (60 degrees to 120 degrees) with respect to the symmetry axis of vehicle 1 (the line passing through the center of the front end of vehicle and the center of the rear end of vehicle 1). The white line detection is performed for the purpose of determining whether vehicle 1 is in the parking lot, and therefore does not evaluate the interval, length or the like of the white lines. As such, the detection range may be a limited range reflecting only a near portion of a parking slot line in the surrounding image. In the case where parking slot detection section 140 detects a plurality of white lines matching the condition, it is determined that vehicle 1 is in a parking lot, and state management section 120 advances the state.

Note that in the example illustrated in FIG. 1, a state where vehicle 1 moves straight in the region on the +side of parking slots S1, S2 and S3 in the Y direction before the white line is detected is state 2.

In state 3 (preparation state), the surrounding image is stored in storage section 170 in linkage with the time information. Images in which white lines (whites line substantially perpendicular to the symmetry axis of vehicle 1) are detected among the images used for the white line detection may only be stored as surrounding images, or images captured periodically (e.g., every second) may be stored as surrounding images without being sorted.

In storage section 170, state management section 120 stores, as the steering time point, the time point when a steering force equal to or greater than a threshold value (e.g., 1 kg) is applied to the steering wheel in the straight movement state at a steering angle of about 0, and state management section 120 advances the state.

Note that in the example illustrated in FIG. 1, a state where vehicle 1 moves straight in the region on the +side of parking slots S1, S2 and S3 in the Y direction before steering is performed at position P1 after a white line is detected is state 3.

In state 4 (detection state), parking slot detection section 140 detects a parking slot from an image in which the image capturing time point is immediately before the steering time point. Alternatively, parking slot detection section 140 may detect the parking slot from an image captured at the steering time point.

At this time point, whether to perform the automatic parking is not determined, and therefore this parking slot detection may be referred to as speculative parking slot detection. In the case where there is a parking vehicle in a parking slot, the parking slot line is partially hidden by the parking vehicle, and consequently the parking slot is not detected because the length of the detected white line does not meet the condition. Therefore, a time when a parking slot is detected may be referred to as a time when an available parking slot is detected.

When vehicle 1 stops after the vehicle body turns by 30 degrees to 60 degrees from the steering point, state management section 120 advances the state.

Note that in the example illustrated in FIG. 1, the state from steering at position P1 to stop at position P2 of vehicle 1 is state 4.

In state 5 (calculation state), path calculation section 150 calculates the vehicle position of the image capturing time point (coordinate offset) with respect to the current vehicle position by adding up the movement information from the image capturing time point of the image where the parking slot is detected to the time point when vehicle 1 stops. Upon completion of the parking slot detection, path calculation section 150 calculates the location information of the parking slot with respect to the current vehicle position by adding the coordinate offset to the location information of the parking slot. Path calculation section 150 calculates the parking path for parking in the parking slot from the current vehicle position.

At this time point, whether to perform the automatic parking is not determined, and therefore it may be referred to as speculative path calculation. When the parking path is calculated, display image output section 180 outputs an image indicating the parking slot and the parking path, and outputs a message for inquiring the occupant about whether to perform parking. After the output of the image and the message, state management section 120 advances the state.

Note that in the example illustrated in FIG. 1, a state from the stop at position P2 of vehicle 1 and the calculation of the parking path by parking support apparatus 100 to the output of the above-mentioned message is state 5.

In state 6 (inquiry state), operation reception section 110 receives a parking instruction operation. When there is a parking instruction operation, state management section 120 advances the state. Note that in the example illustrated in FIG. 1, a state until the parking instruction operation of the occupant after the output of the message is state 6.

In state 7 (self-driving state), drive control section 160 performs the automatic parking in accordance with the calculated path. Upon completion of the automatic parking, state management section 120 advances the state. Note that in the example illustrated in FIG. 1, a state where vehicle 1 performs the automatic parking from position P2 to position P3 is state 7.

In state 8 (completed state), parking support apparatus 100 makes a notification of completion of the automatic parking. Upon completion of the notification, state management section 120 resets the state to state 2. Note that in the example illustrated in FIG. 1, a state of vehicle 1 from the stop at position P3 to the notification is state 8.

Note that when driving to an available parking slot where vehicle 1 is to be parked, the occupant performs steering when the occupant visually recognizes that the parking slot is available. As such, parking slot detection section 140 may set the parking slot detection region in accordance with the position of the occupant at the time of steering. The position of the occupant may be specified as the position of the occupant's head.

It is also necessary for the occupant to visually recognize the driving direction of vehicle 1, and therefore the occupant visually recognizes the parking slot located at an obliquely forward position. It should be noted that there is a time difference between the visual recognition of the available parking slot and the steering, and in some situation vehicle 1 has already been advanced to a lateral side of the available parking slot at the time point of steering. Therefore, preferably parking slot detection section 140 sets the parking slot detection region to the region from the lateral side to the obliquely forward side of the occupant.

Figure 6:
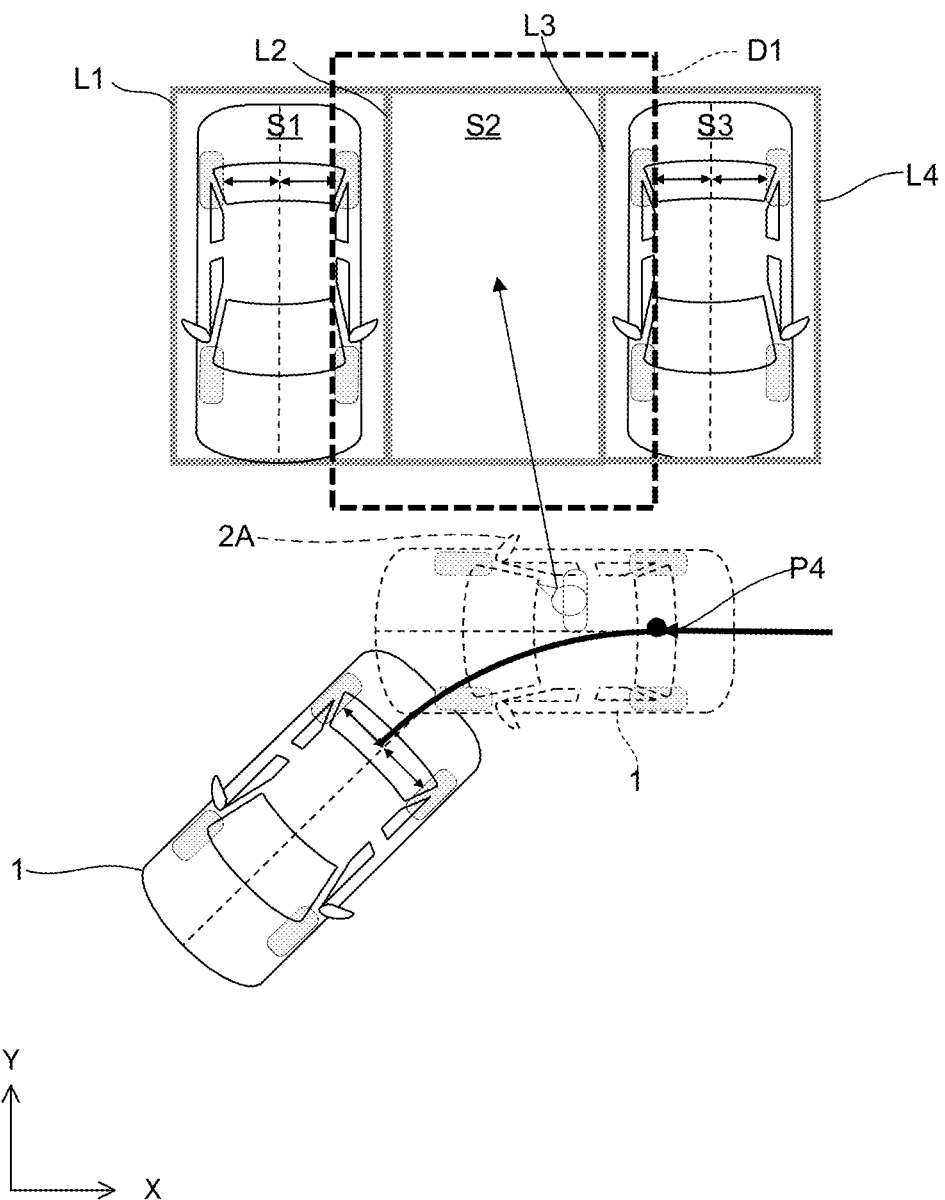
FIG. 6 is a diagram for describing a setting of a parking slot detection region.

FIG. 6 illustrates parking slots S1, S2 and S3 similar to those illustrated in FIG. 1, and an example where vehicle 1 drives from the +side to −side in the X direction in the region on the −side than parking slots S1, S2 and S3 in the Y direction in order to park in parking slot S2. In this example, parking slot detection region D1 is set as a region from the lateral side (the +side in the Y direction) to the obliquely forward side (the −side in the X direction and the +side in the Y direction) of the occupant at the time of parking vehicle 1 in parking slot S2 by steering at position P4 before parking slot line L3.

Since the occupant performs steering for backward parking, the parking slot detection region is located on the side opposite to vehicle 1 with respect to the straight movement line of vehicle 1. As such, preferably, the parking slot detection region is on the side opposite to the turning direction of vehicle 1 with respect to the straight movement line of vehicle 1, and includes the lateral side to the obliquely forward side of the occupant with respect to the position of the occupant at the time of steering of vehicle 1. The straight movement line of vehicle 1 may be referred to as a line extending the straight portion of the driving path of vehicle 1. During the steering, camera 2A (side camera) provided at a side of vehicle 1 is often located on the side of the available parking slot as illustrated in FIG. 6, and therefore parking slot detection section 140 may set the side of the side camera as the parking detection region.

Figure 7:
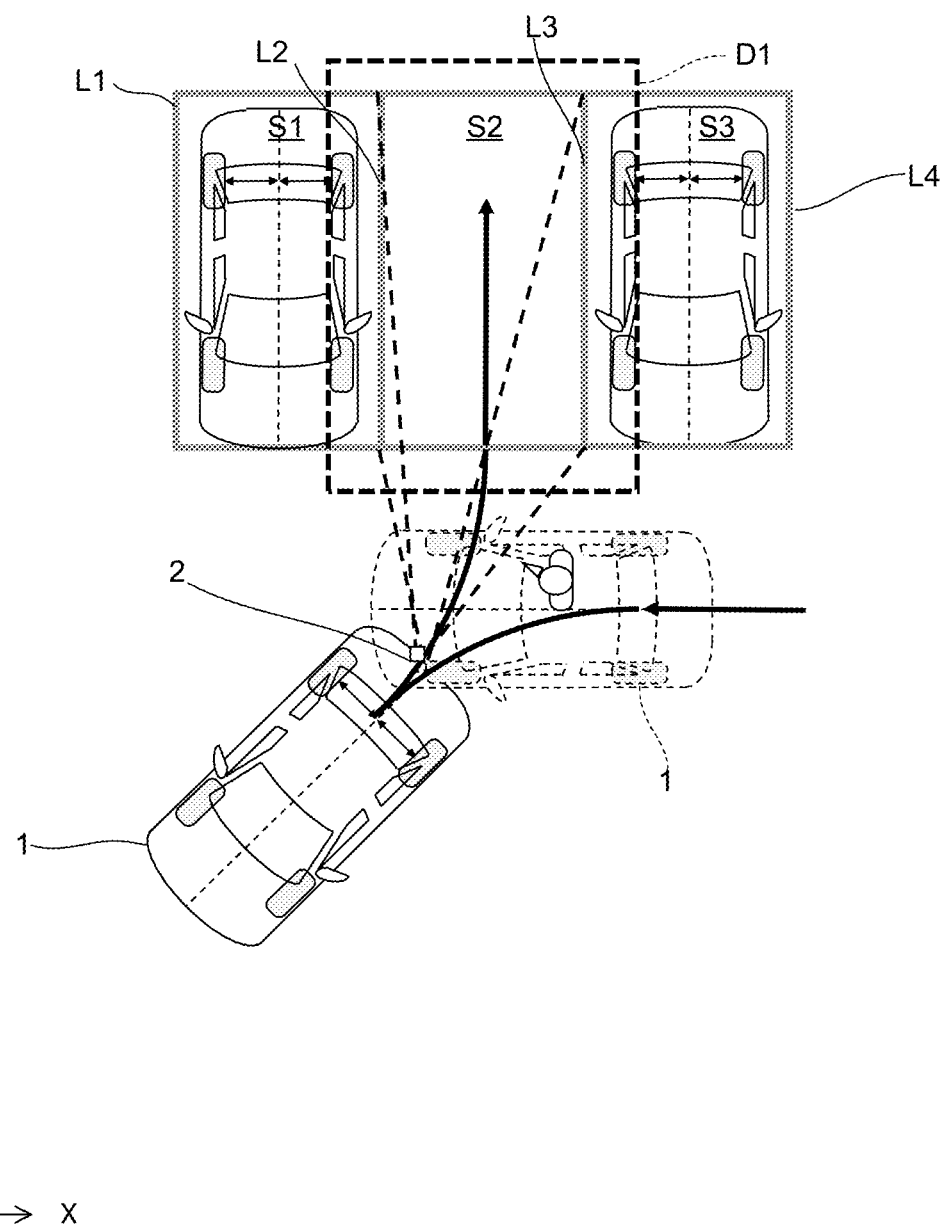
FIG. 7 is a diagram illustrating an example in which parking slot detection is performed with a rear camera.

In addition, as illustrated in FIG. 7 when the occupant steers in front of the available parking slot and vehicle 1 stops after turning about 45 degrees, camera 2 (rear camera) provided at the rear portion of vehicle 1 often captures the entirety of the available parking slot.

As with FIG. 6, FIG. 7 illustrates an example state of vehicle 1 about to park in parking slot S2, in which camera 2 provided at the rear portion of vehicle 1 can detect the four corners of parking slot S2 when vehicle 1 stops after steering and turning in forward movement to park in parking slot S2.

In view of this, for example, in the case where parking slot detection section 140 does not perform the speculative parking slot detection in state 4 but performs the parking slot detection from the rear camera image first in state 5 and detects no parking slot, the parking slot detection may be performed by using the image at the time of the steering.

In this case, the hiding effect of the processing time is smaller than in the case where the parking slot detection is speculatively started in state 4, but the time required for the parking is shortened than in known systems because the speculative parking slot detection is started without waiting for the automatic parking instruction at the time of the stop of vehicle 1.

For example, if steering is performed after the occupant passes through the front side of an available parking slot, or if vehicle 1 is turned with a small steering angle and a large rotation radius, the entire vehicle body may pass through the opening direction of the available parking slot. In such a case, when there is a parking vehicle in the parking slot adjacent to the available parking slot, the parking vehicle blocks the available parking slot (long side) and the rear camera may not capture the entirety of the available parking slot (see, for example, FIG. 8). In the case where the speculative parking slot detection is not performed in state 4, the parking slot detection is performed with the rear camera image first in state 5, and, after a failure of the parking slot detection, the parking slot detection is performed with the image at the time of the steering.

Figure 8:
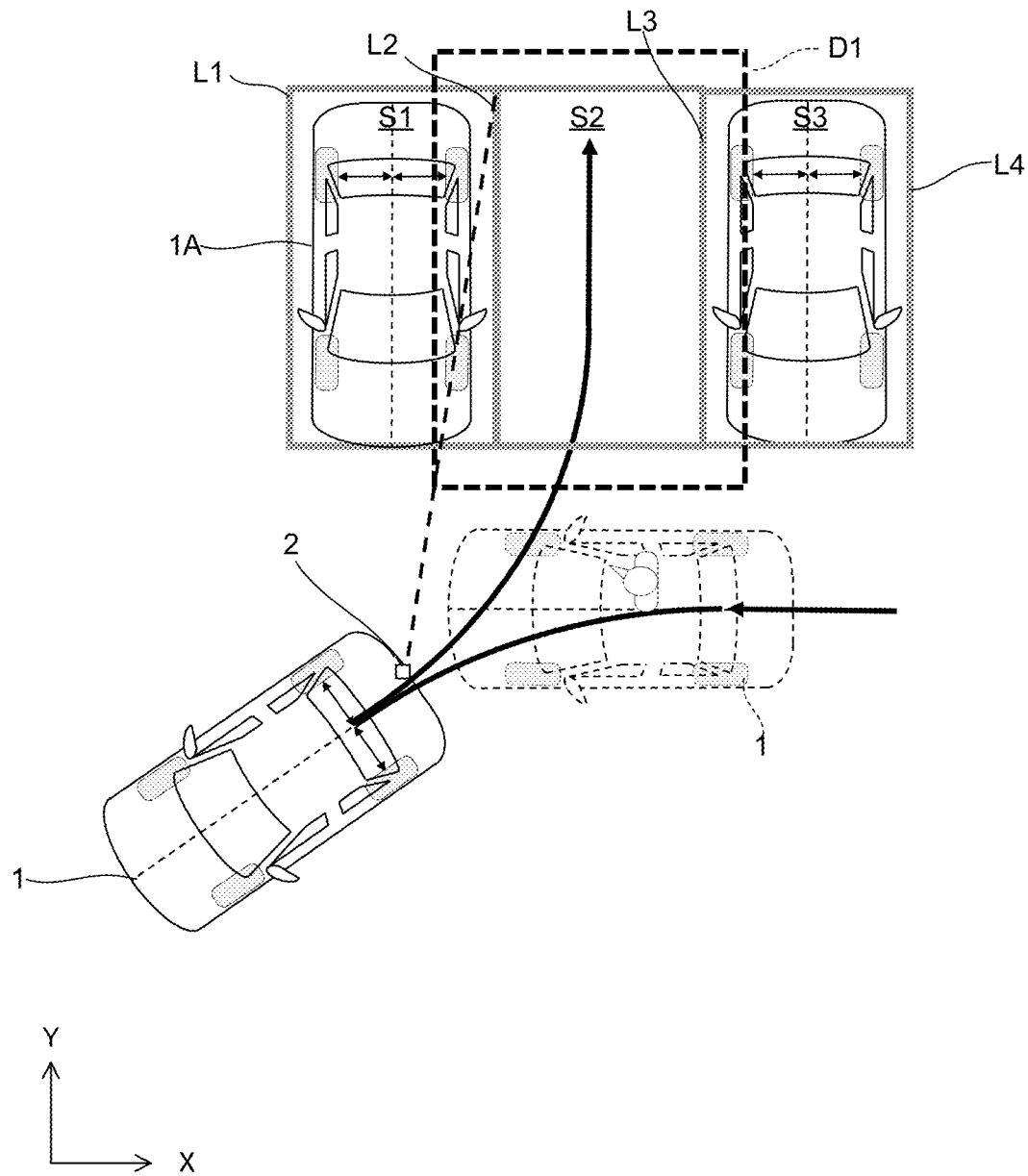
FIG. 8 is a diagram illustrating an example in which the entirety of a parking slot cannot be captured with a camera.

As with FIG. 6, FIG. 8 illustrates an example state of vehicle 1 about to park in parking slot S2, in which when vehicle 1 steers and turns in forward movement to park in parking slot S2, parking vehicle TA of parking slot S1 on the −side of parking slot S2 in the X direction blocks parking slot line L2, and consequently camera 2 provided at the rear portion of vehicle 1 cannot capture the entirety of parking slot S2.

In such a case, since the parking slot detection is performed two times, the parking takes a longer time than in the known systems. However, such a situation does not occur when the occupant's driving is appropriate, and therefore it can be said that the occurrence of such a situation is low. Thus, the expected value of the time required for parking is smaller than that of the known systems.

In addition, for example, the speculative parking slot detection may be executed in state 3 instead of starting the speculative parking slot detection in state 4 after the steering. In this manner, it is possible to expect that the parking slot detection has been completed at the time point when state 5 is set after vehicle 1 turns and stops. In this case, it suffices to perform only the path calculation in state 5, and thus the parking position and the parking path can be presented at an earlier timing than the case where the parking slot is performed in state 4.

In this case, the parking slot detection may be performed with an image of camera 2 (front camera) provided at a front part of vehicle 1. The front camera comes to the opening of the parking slot at an earlier timing than the occupant, and therefore can detect the parking slot detection at an earlier timing.

Figure 9:
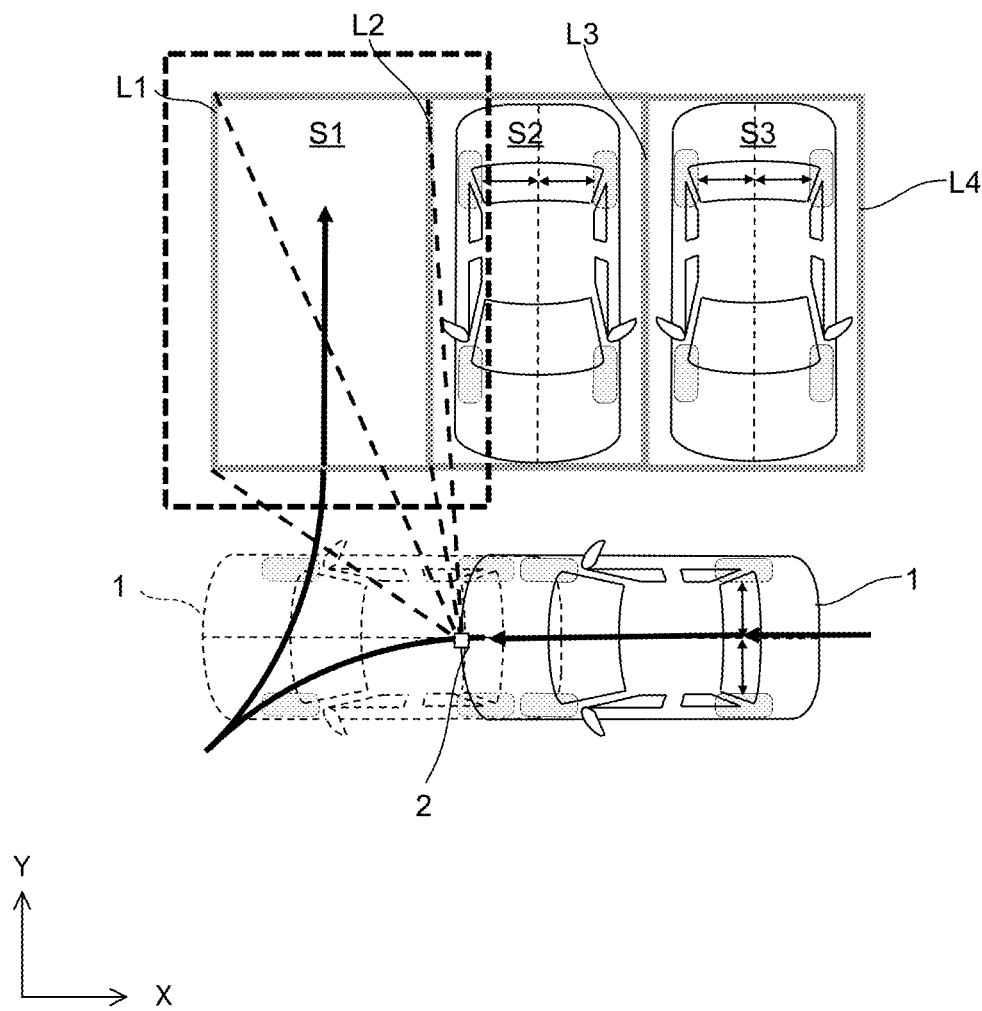
FIG. 9 is a diagram illustrating an example in which the entirety of a parking slot is captured with a front camera.

For example, in FIG. 9, front camera 2 of vehicle 1 moving straight from the +side in the X direction than parking slot S3 to the −side in the X direction captures the entirety of parking slot S1 located on the most −side (frontmost) in the X direction among parking slots S1, S2 and S3.

Note that while there is a disadvantage that the long side falls outside the field of view of the camera if the front camera goes beyond the line extending the long side of the parking slot line, a countermeasure can be taken by estimating the position suitable for the parking slot detection because the parking slot lines are cyclically provided. The position of the front camera is lower than that of the side camera, and therefore can capture the parking slot line without being blocked by the parking vehicle in many cases even before the extending line of the long side.

Figure 10:
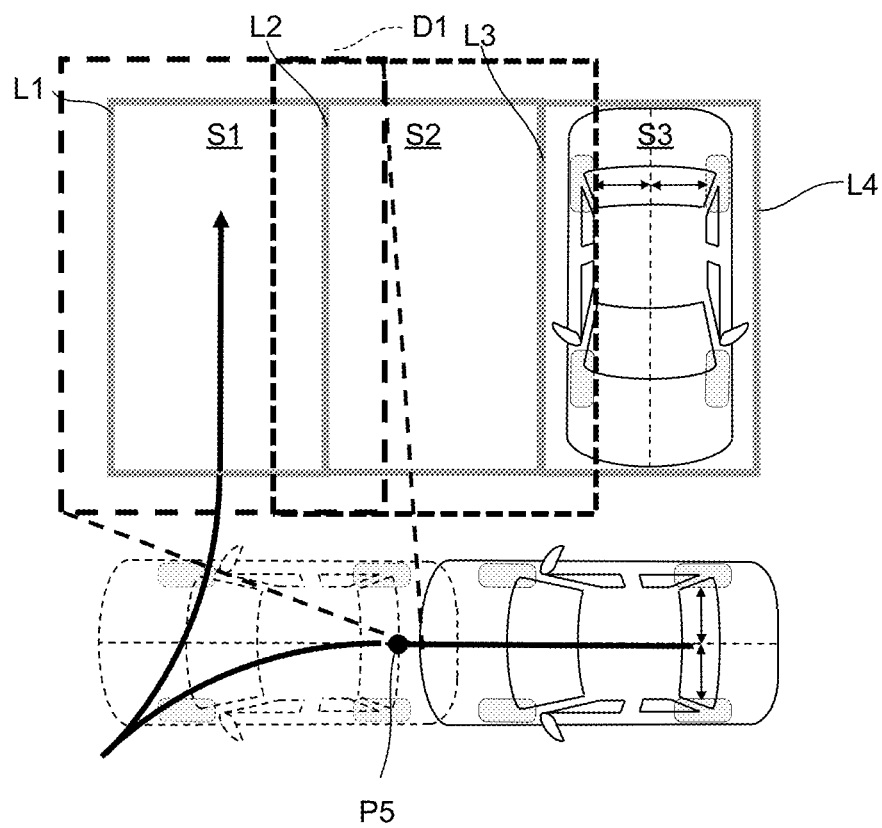
FIG. 10 is a diagram illustrating an example in which a plurality of parking slots is detected.

In the case where the speculative parking slot detection is executed in state 3, a plurality of parking slots, such as parking slot S1 and parking slot S2 in FIG. 10, may be detected at the time point when state 5 is set. In such a case, from the history information, the information on the parking slot (e.g., parking slot S1) of which the image capturing time point is immediately before position P5 of the steering time point (not the newest parking slot detection result among parking slot detection results obtained at the time of steering) is selected. The configuration in which the occupant does not make the selection more achieves the object of reducing the time required for the parking.

If the time required for vehicle 1 to drive by one parking slot is shorter than the time required for the parking slot detection, then the parking slot detection of the region of parking slot S1 is not completed at the time point of generation of the surrounding image of parking slot S1. In such a case, parking slot detection section 140 may store the surrounding image of parking slot S1 in storage section 170 and skip the parking slot detection such that the parking slot detection is performed when the information of parking slot S1 is needed. In the case where the parking slot detection of the region of parking slot S2 is terminated and the parking slot detection of the region of parking slot S1 is started, the terminated parking slot detection of parking slot S2 is executed again when the information of parking slot S2 becomes necessary. Therefore, the expected value of the time required for parking is larger when the termination is performed. Alternatively, to eliminate the necessity of the skip of the parking slot detection, parking support apparatus 100 may request the occupant to decelerate vehicle 1 such that both parking slot S1 and parking slot S2 can be detected.

In addition, the standard (normal) interval of the parking slot lines (the long sides of the parking slot line) is 2.5 m. When vehicle 1 drives in front of the parking slot at 2.5 m/sec, it moves forward by one slot per second. 2.5 m/sec is 9 km/h, which is slightly faster than the 8 km/h posted in many parking lots. When vehicle 1 is driven while looking for available parking slots, vehicle 1 is driven at a speed further lower than 8 km/h, and therefore the risk of missing the available parking slot can be eliminated by driving vehicle 1 while storing the surrounding image in storage section 170 at an interval of one frame per second, for example.

For example, in the case where the parking slot is detected from the image captured by the front camera, it is preferable to perform capturing with the front camera located slightly before the line extending the parking slot line, and therefore, it is preferable to set a constant positional interval of the capturing (e.g., an interval of 2.5 m) than setting a constant time interval of the capturing. Since the distance between the parking slot lines is determined by repeating the parking slot line detection after state 2, the front camera image captured at the position suitable for the parking slot detection can be obtained by estimating the position of the next parking slot line and performing capturing when vehicle 1 reaches that position. During the driving at 8 km/h, the time interval of storing the front camera image is one second or longer. In addition, it is preferable to store the image-capturing time together because the speed is not necessarily constant and the time interval of the capturing is irregular.

For example, in the case where movement information is stored in the memory block at one second intervals, it is preferable to store the start address of the surrounding image in the newest memory block, together with fractions of less than 1 second of the image-capturing time. In this manner, it is possible to calculate the movement distance of vehicle 1 in the period from the storage time of the movement information to the image-capturing time by a complement method. Thus, the distance to the parking slot detected in the surrounding image can be properly calculated later.

In addition, the storing interval of the movement information may be shortened (e.g., 0.1 seconds interval) after the steering time point. The more finely the movement information is stored, more correctly the movement of vehicle 1 from the steering point to the stop position can be estimated. The movement information before the steering is not directly related to the estimation accuracy for the parking slot position, and therefore the storage interval thereof may be long. In the case where the start time point of the automatic parking and the time point of capturing are different from each other, it is necessary to compensate the movement amount therebetween, but it can be compensated by the above-mentioned method.

Figure 11:
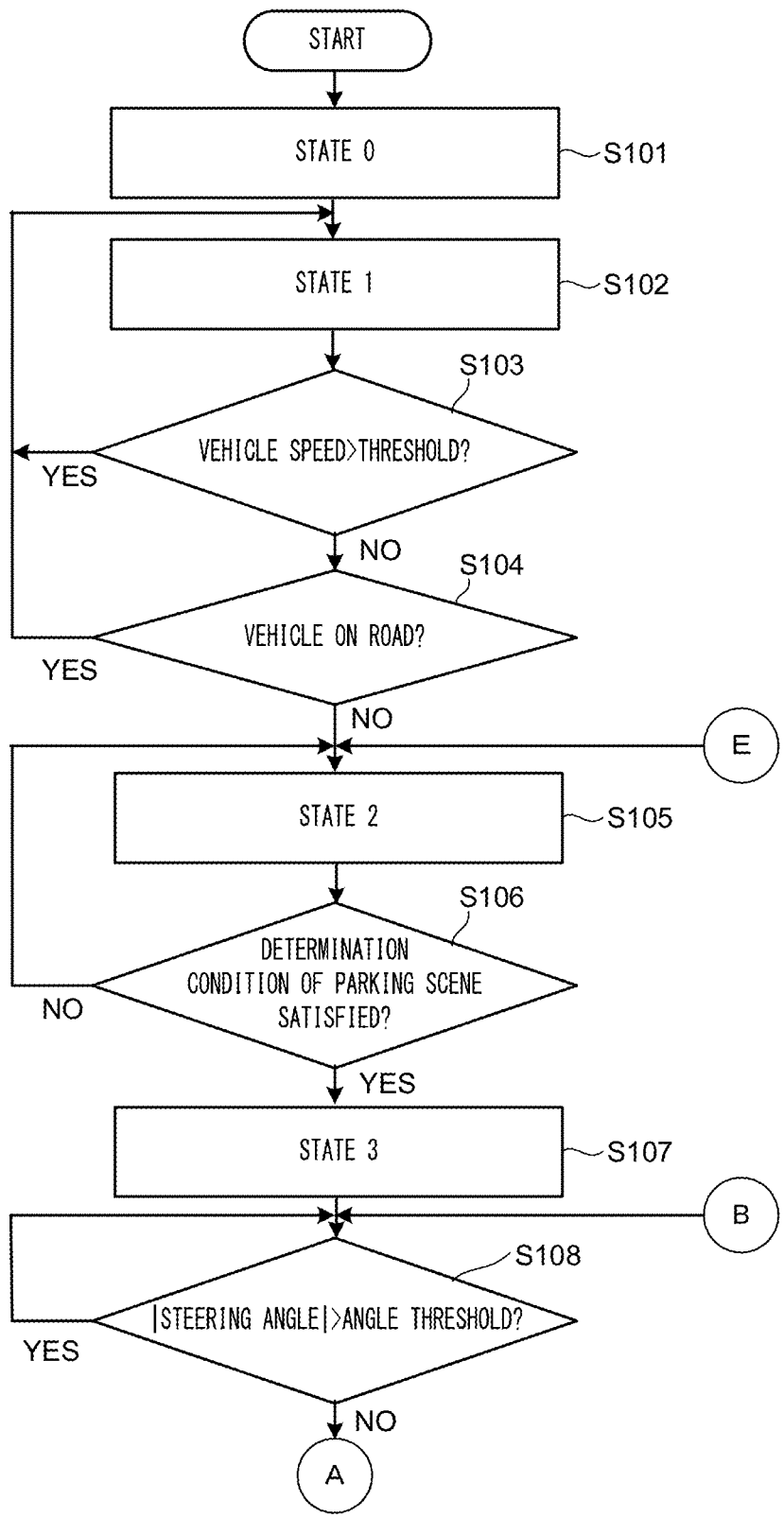
FIG. 11 is a flowchart illustrating an exemplary operation of a parking support control in the parking support apparatus according to the first embodiment.
Figure 12:
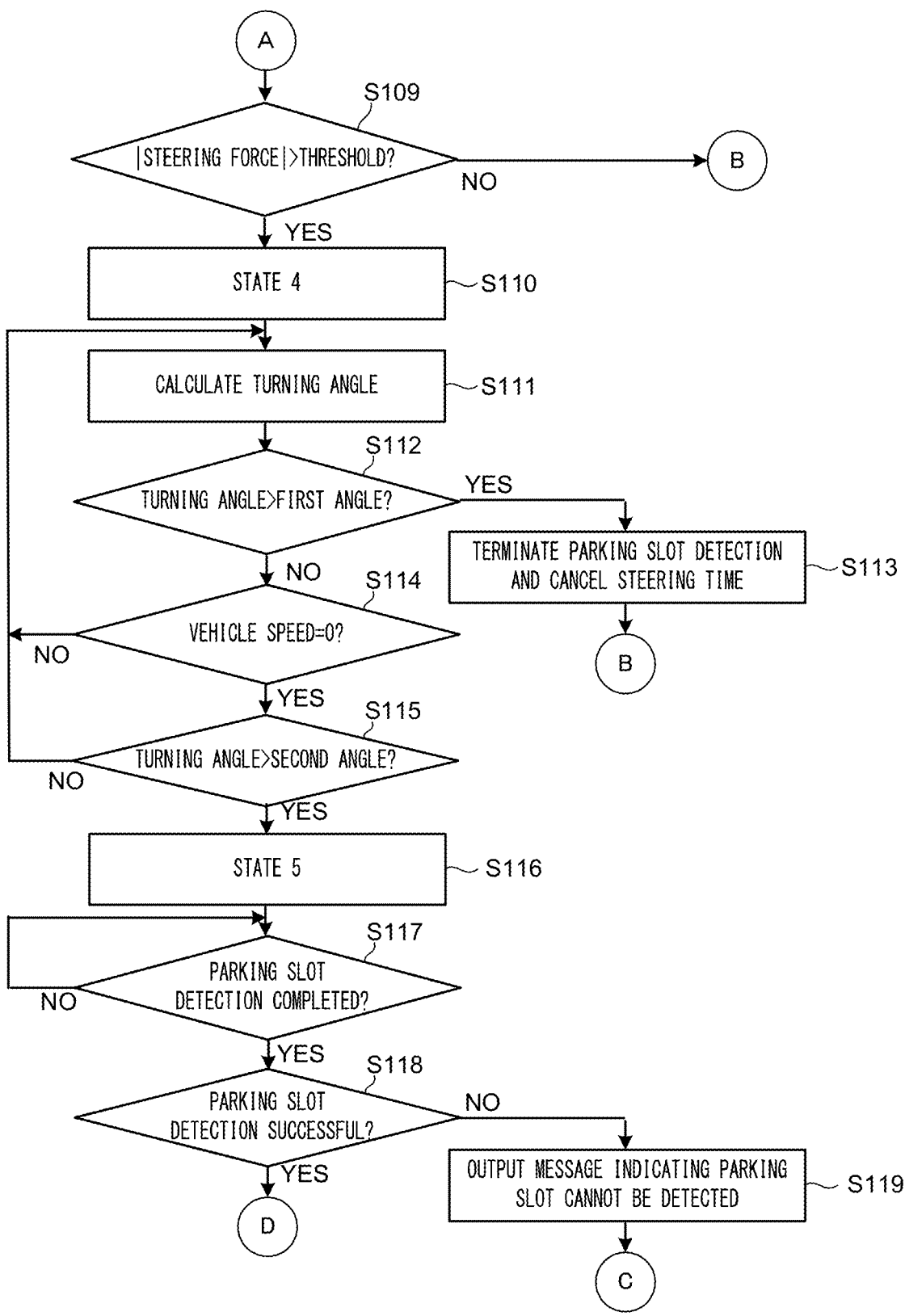
FIG. 12 is a flowchart illustrating an exemplary operation of the parking support control in the parking support apparatus according to the first embodiment.
Figure 13:
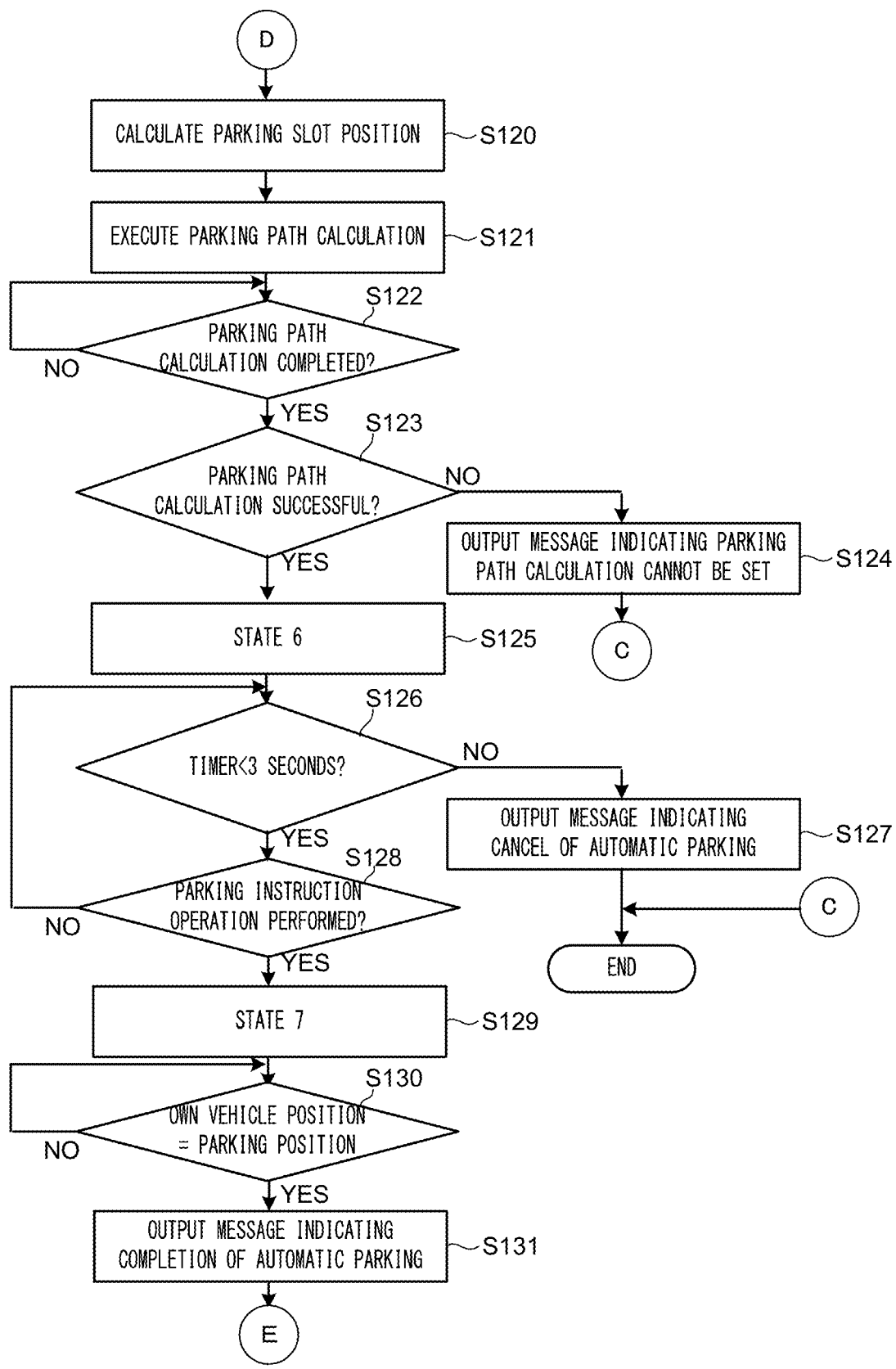
FIG. 13 is a flowchart illustrating an exemplary operation of the parking support control in the parking support apparatus according to the first embodiment.

Next, an exemplary operation of parking support apparatus 100 according to the first embodiment is described. FIGS. 11, 12, and 13 are flowcharts illustrating an exemplary operation of a parking support control of parking support apparatus 100 according to the first embodiment. Note that the following flowchart is started when the power of vehicle 1 is turned ON.

As illustrated in FIG. 11, parking support apparatus 100 (state management section 120) sets the state of the parking support to state 0 (step S101). At step S101, state management section 120 initializes the internal state of parking support apparatus 100.

Next, state management section 120 sets the state of the parking support to state 1 (step S102). At step S102, state management section 120 acquires vehicle speed information from drive control section 160.

Subsequently, state management section 120 determines whether the vehicle speed is smaller than the speed threshold value (e.g., 10 km/h) (step S103). When it is determined that the vehicle speed is equal to or greater than the speed threshold value (step S103, YES), the process is returned to step S102.

On the other hand, when the vehicle speed is smaller than the speed threshold value (step S103, NO), parking support apparatus 100 (state management section 120) determines whether vehicle 1 is located on the road (step S104). The determination whether vehicle 1 is located on the road is made on the basis of the information of navigation apparatus 40. When it is determined that vehicle 1 is located on the road (step S104, YES), the process is returned to step S102.

On the other hand, vehicle 1 is not located on the road (step S104, NO), state management section 120 sets the state of the parking support to state 2 (step S105). Note that even when the information of navigation apparatus 40 cannot be obtained, the state may proceed to state 2. This may be referred to as skip of step S104. In state 2 (step S105), parking support apparatus 100 (parking slot detection section 140) executes the white line detection at a low frequency (at one second intervals).

In state 2, parking support apparatus 100 (state management section 120) determines whether the determination condition of the parking scene is satisfied (step S106). The determination condition of the parking scene is that there is a plurality of white lines substantially perpendicular to the symmetry axis of vehicle 1, and that the white lines are parallel to each other. When it is determined that the determination condition of the parking scene is not satisfied (step S106, NO), the process is returned to step S105.

On the other hand, the determination condition of the parking scene is satisfied (step S106, YES), state management section 120 sets the state of the parking support to state 3 (step S107). At step S107, parking support apparatus 100 (storage section 170) stores the surrounding image in linkage with the time information.

Subsequently, state management section 120 acquires steering angle data from drive control section 160, and determines whether the absolute value of the steering angle is greater than an angle threshold value (e.g., 5 degrees) (step S108). When it is determined that the absolute value of the steering angle is greater than the angle threshold value (step S108, YES), the process of step S108 is repeated.

On the other hand, when the absolute value of the steering angle is smaller than the angle threshold value (step S108, NO), state management section 120 acquires the data about the steering force applied to the steering wheel from drive control section 160 as illustrated in FIG. 12, and determines whether the absolute value of the steering force is greater than a threshold value (e.g., 1 kg) (step S109). Specifically, during turning, i.e., when the steering angle is large, it is not determined to be steering, but when a steering force is applied after the straight movement state, i.e., a state where the steering angle is small, is set, it is determined to be steering. In addition, the determination condition for the straight movement may include a forward movement by a predetermined distance (e.g., 1 m) with a small steering angle.

When it is determined that the absolute value of the steering force is smaller than the threshold value (step S109, NO), the process is returned to step S108 (see also FIG. 11). On the other hand, when the absolute value of the steering force is greater than the threshold value (step S109, YES), state management section 120 sets the state of the parking support to state 4 (step S110).

At step S110, parking support apparatus 100 (storage section 170) stores the steering time, and parking slot detection section 140 starts the parking slot detection for the image captured immediately before the steering time. In addition, parking support apparatus 100 (path calculation section 150) determines the straight movement direction on the basis of the history information before the steering time. More specifically, at the time point of steering, a surrounding image generated from an image captured immediately before the steering is retained in the memory, and therefore storage section 170 prohibits the overwrite of the region containing that surrounding image, and writes the start address and the image-capturing time in the memory block. Thereafter, state management section 120 passes the first address to parking slot detection section 140, and make an instruction of the parking slot detection. In addition, state management section 120 passes the first address also to path calculation section 150, and path calculation section 150 reads, from the history information (the memory block up to three seconds before), the driving direction (yaw angle) of vehicle 1 in the time period from three seconds before the steering time to the steering time, and determines its average value as the straight movement direction. Note that the above-mentioned processes and numerical values are merely examples.

Next, parking support apparatus 100 (path calculation section 150) calculates the turning angle with respect to the straight movement direction (step S111), and state management section 120 determines whether the turning angle is greater than a first angle (e.g., 60 degrees) (step S112). The turning angle is calculated by subtracting the straight movement direction from the yaw angle, and determining its absolute value, for example.

When it is determined that the turning angle is greater than the first angle (step S112, YES), parking support apparatus 100 terminates the parking slot detection, and cancels the steering time (step S113). Thereafter, this process is returned to step S108 (see also FIG. 11). At step S113, when the turning angle is greater than the first angle, parking support apparatus 100 (state management section 120) determines that vehicle 1 has turned right or left, and cancels the processes associated with the steering.

On the other hand, when the turning angle is equal to or smaller than the first angle (step S112, NO), parking support apparatus 100 determines whether the vehicle speed is 0 (step S114). When it is determined that the vehicle speed is not 0 (step S114, NO), the process is returned to step S111. That is, the turning angle monitoring process is looped until vehicle 1 stops.

On the other hand, when the vehicle speed is 0 (step S114, YES), parking support apparatus 100 (state management section 120) determines whether the turning angle is greater than the second angle (e.g., 30 degrees) (step S115). When it is determined that the turning angle is equal to or smaller than the second angle (step S115, NO), the process is returned to step S111. That is, when the turning angle is small, the turning angle monitoring process is looped.

On the other hand, when the turning angle is greater than the second angle (step S115, YES), state management section 120 sets the state of the parking support to state 5 (step S116). This process may be referred to as a process in which the state proceeds to state 5 when vehicle 1 turns 45 degrees±15 degrees from the straight movement state and stops (step S116). At step S116, parking support apparatus 100 specifies the movement amount of vehicle 1 after the image-capturing time. For example, path calculation section 150 calculates the present position (including the relative coordinates and the yaw angle) with respect to the position of vehicle 1 at the image-capturing time by adding up the movement amount after the image-capturing time of the image subjected to the parking slot detection recorded in the history information.

In state 5, parking support apparatus 100 (state management section 120) determines whether the parking slot detection is completed (step S117). When it is determined that the parking slot detection is not completed (step S117, NO), the process of step S117 is repeated. On the other hand, when the parking slot detection is completed (step S117, YES), parking support apparatus 100 determines whether the parking slot detection has succeeded (step S118).

When it is determined that the parking slot detection has not succeeded (step S118, NO), parking support apparatus 100 (display image output section 180) outputs a message indicating that the parking slot is not detected (step S119), and this control is completed (see also FIG. 13). The case where the parking slot detection has not succeeded may be referred to as a case where parking slot detection section 140 has not detected the parking slot, and the case where the parking slot detection has succeeded may be referred to as a case where parking slot detection section 140 has detected the parking slot.

On the other hand, when the parking slot detection has succeeded (step S118, YES), parking support apparatus 100 calculates the position of the parking slot as illustrated in FIG. 13 (step S120). Since the present position with respect to the position of vehicle 1 at the image-capturing time has been calculated at step S116 and the result of the parking slot detection indicates the position of the parking slot with respect to the position of vehicle 1 at the image-capturing time, the position of the parking slot with respect to the present position can be calculated through summation of them. This calculation may be performed by path calculation section 150. Subsequently, path calculation section 150 executes the parking path calculation on the basis of the position of the parking slot with respect to the present position (step S121).

Next, parking support apparatus 100 (state management section 120) determines whether the parking path calculation has been completed (step S122). When it is determined that the parking path calculation has not been completed (step S122, NO), the process of step S122 is repeated. On the other hand, when the parking path calculation has been completed (step S122, YES), parking support apparatus 100 determines whether the parking path calculation has succeeded (step S123).

When it is determined that the parking path calculation has not succeeded (step S123, NO), parking support apparatus 100 (display image output section 180) outputs a message indicating that the parking path cannot be set (step S124), and this control is completed.

On the other hand, when parking path calculation has succeeded (step S123, YES), state management section 120 sets the state of the parking support to state 6 (step S125). At step S125, display image output section 180 outputs a message for inquiring the occupant about whether to select the automatic parking, and state management section 120 sets the timer to 0. The timer is for measuring the waiting time for the occupant's response to the above-mentioned message, i.e., the inquiry about automatic parking.

In state 6, state management section 120 determines whether the timer is less than three seconds (step S126). When the timer is equal to or greater than three seconds (step S126, NO), parking support apparatus 100 outputs a message indicating a cancel of the automatic parking (step S127), and this control is completed. This process may be referred to as a process of determining that the occupant has not selected the automatic parking when the occupant does not make a response within three seconds.

On the other hand, when the timer is less than three seconds (step S126, YES), parking support apparatus 100 determines whether a parking instruction operation has been performed (step S128). The parking instruction operation includes at least one of or a combination of a change of the gear position, a release of the steering wheel, a release of the brake, turning on of the hazard lamp, and an operation of a button corresponding to the parking instruction. For example, when the steering wheel and the brake are released with the gear set to R, parking support apparatus 100 determines that the parking instruction operation has been performed.

When it is determined that no parking instruction operation has been performed (step S128, NO), the process is returned to step S126. On the other hand, when the parking instruction operation has been performed (step S128, YES), state management section 120 sets the state of the parking support to state 7 (step S129). At step S129, parking support apparatus 100 (drive control section 160) starts the automatic driving by controlling vehicle 1. This process may be referred to as a process of starting the automatic parking by determining that the occupant has selected the automatic parking when the occupant has performed the parking instruction operation within three seconds.

Next, parking support apparatus 100 determines whether the own vehicle position is the parking position (step S130). When it is determined that the own vehicle position is not the parking position (step S130, NO), the process of step S130 is repeated. This process may be referred to as a process of continuing the automatic driving until vehicle 1 reaches the parking position.

On the other hand, when the own vehicle position is the parking position (step S130, YES), parking support apparatus 100 outputs a message indicating that the automatic parking has been completed (step S131). Thereafter, the process is returned to step S105.

Note that when the vehicle speed becomes greater than the speed threshold value in the above-mentioned step S104 to step S124, the process may be immediately advanced to step S102. In addition, when the position of vehicle 1 becomes a position on the road in the above-mentioned step S105 to step S124, the process may be immediately advanced to step S102. Specifically, even when the vehicle is driving outside the road at a low speed and the storing of the movement information of vehicle 1 has been started upon detection of a white line, parking support apparatus 100 may determine that the scene is not the parking scene when vehicle 1 comes out to the road or when the vehicle speed has been increased, and then parking support apparatus 100 may return to step S102 of determining whether the scene is a parking scene.

In addition, in the determination process after step S125, the occupant may make an instruction not to perform the automatic parking. For example, when waiting for the parking instruction operation at step 126 and step 128, the instruction not to perform the automatic parking may be received at HMI apparatus 20. When an instruction is made by the occupant, the instruction takes precedence, and as such the determination may not be made on the basis of the position or vehicle speed of vehicle 1. In addition, in each step, the control is completed in the case of IG-OFF.

In addition, the timing of the output of the message for inquiring the occupant about whether to select the automatic parking may be earlier than step S125. This process may be referred to as a process of speculatively inquiring the occupant without waiting for the completion of path calculation. For example, at step S116, the above-mentioned message may be output at the time point when vehicle 1 turns 45 degrees±15 degrees and stops. In this manner, the path calculation is performed in parallel to the parking instruction operation performed by the occupant, the time required for the parking can be shortened as a whole.

In addition, taking into consideration that a plurality of parking instruction operations is provided and the plurality of parking instruction operations is each performed in an order, the step of determining the parking instruction operation may be divided into a plurality of parts. For example, a message for inquiring the occupant about whether to select the automatic parking may be output at the time point when gear position is set to R after step S116, and thereafter the reception of the parking instruction operation may be completed to start the automatic driving at the time point when the steering wheel and the brake are released.

In the case where the timing of the occupant inquiry is advanced in this manner, parking support apparatus 100 may increase the inquiry waiting time at step S126 (the period for determining that the occupant has not selected the automatic parking) in consideration of the time required for the occupant's operation and/or the calculation processing time performed in parallel. For example, in the case where the inquiry is made at the time point when gear position is set to R, parking support apparatus 100 may set the above-mentioned waiting time to four seconds by increasing it by one second from the three seconds of step S126. For example, in the case where the inquiry is made at the time point of step S116 (the time point of the stop), it may be set to six seconds by increasing it by three seconds from the three seconds.

According to the present embodiment with the above-mentioned configuration, state management section 120 detects the occupant's parking instruction on the basis of the operation information or the movement information history of vehicle 1 stored in storage section 170. State management section 120 corresponds to "instruction detection section" of the present disclosure.

More specifically, state management section 120 determines that a parking instruction is detected when the operation information or the movement information history of vehicle 1 indicates that vehicle 1 has stopped after steering and turning from a straight movement, and the occupant has performed a predetermined parking instruction operation. When state management section 120 detects a parking instruction, drive control section 160 outputs a command for performing the automatic parking of vehicle 1 to vehicle control apparatus 30 on the basis of the parking slot information. Drive control section 160 corresponds to "vehicle control section" of the present disclosure.

In this manner, the automatic parking can be started when vehicle 1 stops after steering and there is a parking instruction. Since the automatic parking path substantially overlaps the range of the path of vehicle 1, it is not necessary to additionally request the safe confirmation. In addition, since the position to be parked can be determined based on the steering position and the steering direction, it is not necessary to instruct the parking position.

In this manner, in the present embodiment, the start of the automatic parking does not require the confirmation and/or the instruction, and thus the automatic parking can be started in a short time.

In addition, in the present embodiment, vehicle 1 performs speculative parking slot detection with the steering from the straight movement as a trigger, and thus can perform the parking slot detection by using the time period from the steering to the stop. As a result, the automatic parking can be started in a shorter time in comparison with the configuration where the parking slot detection is performed after the stop. Thus, in the present embodiment, the automatic parking can be performed more smoothly.

In addition, state management section 120 sets the state of the parking support to state 3 when the scene is determined to be the parking scene based on the determination whether the scene is a parking scene of vehicle 1, sets the state of the parking support to state 2 for the scene of determining whether it is the parking scene, and sets the state of the parking support to state 1 for the scene of not determining whether it is the parking scene (the scene of driving on the road). That is, when the state is not the parking scene, state management section 120 sets the state of the parking support to state 2 where the function of parking support apparatus 100 is limited than after state 3. When it is not necessary to determine the parking scene, state management section 120 sets the state of the parking support to state 1 where the function of parking support apparatus 100 is further limited. Thus, state management section 120 corresponds to "scene determination section" and "function limitation section" of the present disclosure.

That is, when the vehicle is on the road and is not obviously a parking scene (state 1), state management section 120 does not make parking slot detection section 140 function at all. In addition, in the scene of not determining whether the scene is the parking scene (state 2), state management section 120 causes parking slot detection section 140 only to perform the white line detection at a low frequency, the parking slot detection of parking slot detection section 140 or the history storage of storage section 170 are not performed. This process may be referred to as a process in which with the function limitation of state management section 120, the parking slot detection of parking slot detection section 140 and the history storage of storage section 170 are limited in accordance with the scene.

In this manner, the parking slot detection and the history storage are not performed at all times, the operation load of parking support apparatus 100 can be reduced. Note that it is possible to limit one of the parking slot detection and the history storage.

In addition, when vehicle 1 is located outside the road and the vehicle speed is equal to or lower than a prescribed value (the above-mentioned speed threshold value), state management section 120 sets the state of the parking support to state 2, and to state 1 otherwise. In other words, when vehicle 1 is located outside the road and the vehicle speed is equal to or lower than the prescribed value (the above-mentioned speed threshold value), state management section 120 does not limit the execution of the white line detection of parking slot detection section 140.

In this manner, when vehicle 1 is driving at a relatively low speed in a location that can be assumed as a location outside the road, i.e., a parking lot, white line detection is performed with no limitation, and thus an unnecessary operation load for determination of the parking scene can be eliminated.

In addition, state management section 120 determines that the scene is the parking scene when vehicle 1 is located outside the road, the vehicle speed is equal to or lower than the prescribed value, and a plurality of white lines substantially orthogonal to the driving direction of vehicle 1 are detected.

In this manner, when determining the parking scene, the white line indicating the path is discriminated from the parking slot line, and thus erroneous determinations of the scene with no parking slot as the parking scene can be avoided. Note that state management section 120 may determine that the scene is the parking scene on the basis of one of a fact that vehicle 1 is located outside the road, a fact that the vehicle speed is equal to or lower than the prescribed value, and a fact that a plurality of white lines substantially orthogonal to the driving direction of vehicle 1 is detected. For example, a fact that vehicle 1 is located outside the road may be omitted from the determination condition.

In addition, parking slot detection section 140 may set the parking slot detection region such that it is located on the side opposite to the turning direction of vehicle 1 with respect to straight movement line of vehicle 1, and that it includes the lateral side to the obliquely forward side of the occupant with respect to the position of the occupant at the time of steering of vehicle 1.

In this manner, the parking slot detection region is limited to the region expected for the parking slot, and thus the processing time required for the detection can be shortened. In addition, by limiting the size of the parking slot detection region to a size larger than one parking slot but smaller than two parking slots, the processing for a case where two parking slots are simultaneously detected can be omitted.

In addition, parking slot detection section 140 may perform the parking slot detection on the basis of the selected surrounding image by selecting, from the surrounding image, the surrounding image including the region located on the side opposite to the turning direction of vehicle 1 with respect to the straight movement line of vehicle 1, and on the lateral side to the obliquely forward side of the occupant with respect to the position of the occupant at the time of steering of vehicle 1.

In this manner, the parking slot detection region is limited to the region expected for the parking slot, and thus the processing time required for the detection can be shortened.

In addition, path calculation section 150 calculates the parking path on the basis of the parking slot information selected from the surrounding image, i.e., the parking slot information detected by parking slot detection section 140.

In this manner, the path calculation can be performed by sorting the targets, the processing time can be shortened in comparison with the configuration of calculating the parking path for all parking slots.

In addition, when parking slot detection section 140 detects a parking slot at the stop position, drive control section 160 performs the automatic parking toward the detected parking slot. When parking slot detection section 140 does not detect a parking slot at the stop position, parking slot detection section 140 may detect the parking slot on the basis of the surrounding image captured at or before the steering.

That is, parking support apparatus 100 may perform the parking slot detection from the rear camera image at the stop position first such that the parking slot detection is performed by using the image at the time of the steering when no parking slot is detected at that position.

In this manner, the speculative parking slot detection is not started before the stop of vehicle 1, and thus the unnecessary operation load for parking slot detection can be eliminated. Note that since the probability that the parking slot cannot be detected from the rear camera image at the stop position is low, the expected value of the time required for the parking slot detection will not be significantly larger than the time required for a single parking slot detection, thus achieving the effect of reducing the time for the detection of the parking instruction on the basis of the operation information or the movement information history of vehicle 1. As a result, the time required for parking is shortened than in known systems.

In addition, the hazard lamp may be turned on during the automatic parking. That is, drive control section 160 may output a command for turning on the hazard lamp when vehicle 1 performs automatic driving by stopping at a position turned by a predetermined angle or more after steering from the straight movement.

In this manner, the status of the automatic driving can be easily recognized.

Modifications of First Embodiment

In the following, modifications of the first embodiment of the present disclosure are described. The first embodiment describes an example in which when the scene determination is performed and vehicle 1 goes outside the road, the white line detection is started in accordance with the result of the scene determination. Then, when periodic white lines are detected, the parking slot detection is started in accordance with the result of the scene determination.

More specifically, state management section 120 functions as the scene determination section and the function limitation section to determine whether the scene is a parking scene, and limit the parking slot detection and the storage of the motion history of the storage section in accordance with the determination result, but this determination may be performed by the occupant. For example, an activation button for activating parking support apparatus 100 may be provided, and parking slot detection section 140 may start the parking slot detection when the activation button is pushed. That is, the operation of the occupant may replace the scene determination.

In addition, the first embodiment describes the surrounding image is stored during the driving of vehicle 1, and parking slot detection section 140 performs the parking slot detection when steering is performed, but the parking slot detection may be executed at all times instead of performing at only a specific timing. In addition, storage section 170 may store the detected parking slot information and path calculation section 150 may perform the path calculation on the basis of the parking slot information stored in storage section 170.

In addition, the first embodiment describes an example in which the parking slot matching the history is selected on the basis of the occupant position at the time point of turning from the straight movement, but the parking slot matching the history may be selected on the basis of the position of the vehicle or the occupant at the time point of turning from the straight movement. For example, when the occupant views the image of camera 2 (front camera) provided at the front part of vehicle 1, an available parking slot can be recognized at an earlier timing because the front camera comes to the opening of the parking slot at an earlier timing than the occupant, and a detection of a parking slot may be notified before the visual recognition by the occupant by detecting the parking slot with the front camera image. That is, since the turning can be started by determining that there is an available parking slot regardless of the position of the occupant, the parking slot matching the history may be selected on the basis of the vehicle position. Note that the opening of the parking slot is a name for convenience for the region on the path on the front side of the parking slot, and may be referred to as a region in contact with the short side of the entrance of the parking slot, or may be referred to as a region extended to the path side from the parking slot.

Second Embodiment

A second embodiment of the present disclosure is described below. The first embodiment describes an example in which the operation or the path until the occupant stops the vehicle in the parking lot is stored as a history and regarded as the parking instruction including the instruction of the target parking slot for parking the vehicle, and the parking slot matching the history and located on the opposite side of the stop position of the vehicle with respect to the advancing direction of the straight movement of the vehicle is selected as the target parking slot among the parking slots detected by the parking slot detection section. That is, the parking position of the automatic parking is determined depending on the driving to the stop position. When the parking slot is detected, information on the positional relationship of vehicle 1 with respect to the parking slot at that time point is obtained, and, together with the information on the vehicle speed and advancing direction, the transition of the positional relationship of the case where parking is intended can be estimated. In view of this, the driving to the stop position can be supported by providing an appropriate notification on the basis of the parking slot information detected by the parking slot detection section at the time point when the positional relationship of vehicle 1 and the parking slot or the positional relationship of the occupant and the parking slot becomes a predetermined positional relationship. The second embodiment discloses the driving support up to the stop position.

In addition, the first embodiment describes an example in which the parking slot detection region is limited to a size smaller than two parking slots, but the parking slot detection region may be set such that a plurality of parking slots can be simultaneously detected. Further, in the case where a plurality of successive parking slots is detected, the driving to the stop position can be supported such that the occupant can perform parking to the intended parking slot.

In the case where a plurality of successive parking slots, such as parking slot S1 and parking slot S2 in FIG. 10, is detected, the parking slot intended by the occupant and the target parking slot (the parking slot set to the target parking position) may not coincide with each other in some situation. Parking support apparatus 100 determines the target parking slot on the basis of the position of the vehicle or the occupant at the time point of steering and turning from the straight movement. That is, since there are the positional range where the target parking slot is set to parking slot S1 and the positional range where the target parking slot is set to parking slot S2, the mismatch of the parking slot intended by the occupant and the target parking slot tends to occur when the occupant is located in the vicinity of the boundary line of the two ranges.

For example, it is assumed that when the occupant steers vehicle 1 to park the vehicle in parking slot S1 by looking parking slot S1 in the obliquely forward direction, the start point of turning of the steering wheel is P5. Here, if parking support apparatus 100 selects parking slot S2 as the target parking slot on the basis of the fact that the steering point P5 of vehicle 1 is located at the front side (opening) of parking slot S2, target parking slot S2 does not match parking slot S1 intended by the occupant.

In the second embodiment, through a support in the form of a notification, parking support apparatus 100 guides the occupant to turn the steering wheel by avoiding the timing that tends to cause erroneous estimation. The second embodiment is described below.

Figure 14:
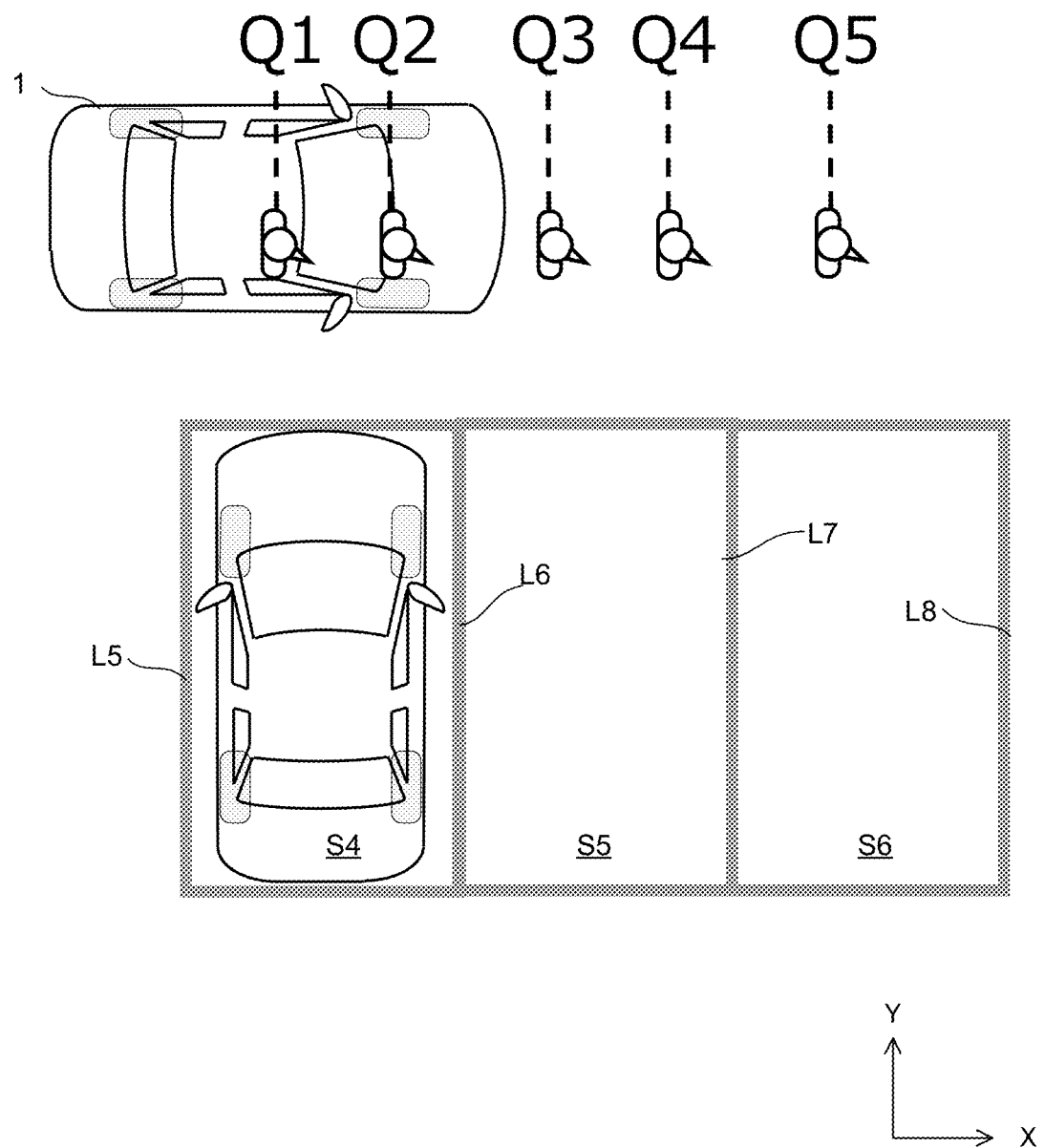
FIG. 14 is a diagram for describing exemplary parking of a vehicle in a second embodiment.

The example of FIG. 14 illustrates a parking lot where three parking slots S4, S5 and S6 are disposed in this order from the −side in the X direction. Parking slot S4 is a parking slot between parking slot lines L5 and L6, parking slot S5 is a parking slot between parking slot lines L6 and L7, and parking slot S6 is a parking slot between parking slot lines L7 and L8. The example of FIG. 14 illustrates a case where the available parking slot is S5 and S6, and vehicle 1 drives forward from the −side to the +side in the X direction on the path facing three parking slots S4, S5 and S6.

FIG. 14 illustrates an example of the positions Q1 to Q5 of the occupant (the driver) at respective time points when vehicle 1 passes through the front side of the parking slot. Note that while the positions of the occupant and vehicle 1 are illustrated for position Q1, only the occupant is illustrated without vehicle 1 for Q2 to Q5. Q1 is the position of the occupant at the time point when a notification of detection of parking slot S5 is made, for example. At a time up to this time point, e.g., at the time when parking support apparatus 100 starts the parking slot detection, it is preferable to make an advance notification of making count down and turning of the steering wheel during the count down such as "turn steering wheel during count down", for example. In this manner, the occupant can turn the steering wheel at a timing corresponding the notification and to his or her intended parking.

For example, while the position of the occupant falls within the range from Q1 to Q2, parking support apparatus 100 makes an announcement "park in front parking slot?". Then, since parking slot S6 is farther from the occupant than parking slot S5, and parking slot S5 is located closer, the occupant can understand that they are asked whether to park vehicle 1 in parking slot S5. Subsequently, while the occupant's position moves from Q2 to Q3, parking support apparatus 100 makes a count down "3, 2, 1". Since the occupant has received the announcement "turn steering wheel during count down" beforehand, the occupant can turn the steering wheel accordingly when the occupant parks the vehicle in parking slot S5. Thus, the target parking position is set to parking slot S5. When the occupant will not park the vehicle in parking slot S5, it is not necessary to turn the steering wheel.

When the occupant's position reaches Q3, parking support apparatus 100 makes an announcement "park in next slot?". The occupant can understand that the next slot is parking slot S6 on the basis of the positional relationship between the parking slot and vehicle 1. Subsequently, while the occupant's position moves from Q4 to Q5, parking support apparatus 100 makes a count down "3, 2, 1". When the occupant turns the steering wheel during this count down, the target parking position is set to parking slot S6.

In this manner, by receiving the notification at the timing corresponding to the relative position with the parking slot and turning the steering wheel in accordance with the notification, the target parking position can be reliably set to the parking slot for parking intended by the occupant.

Figure 15:
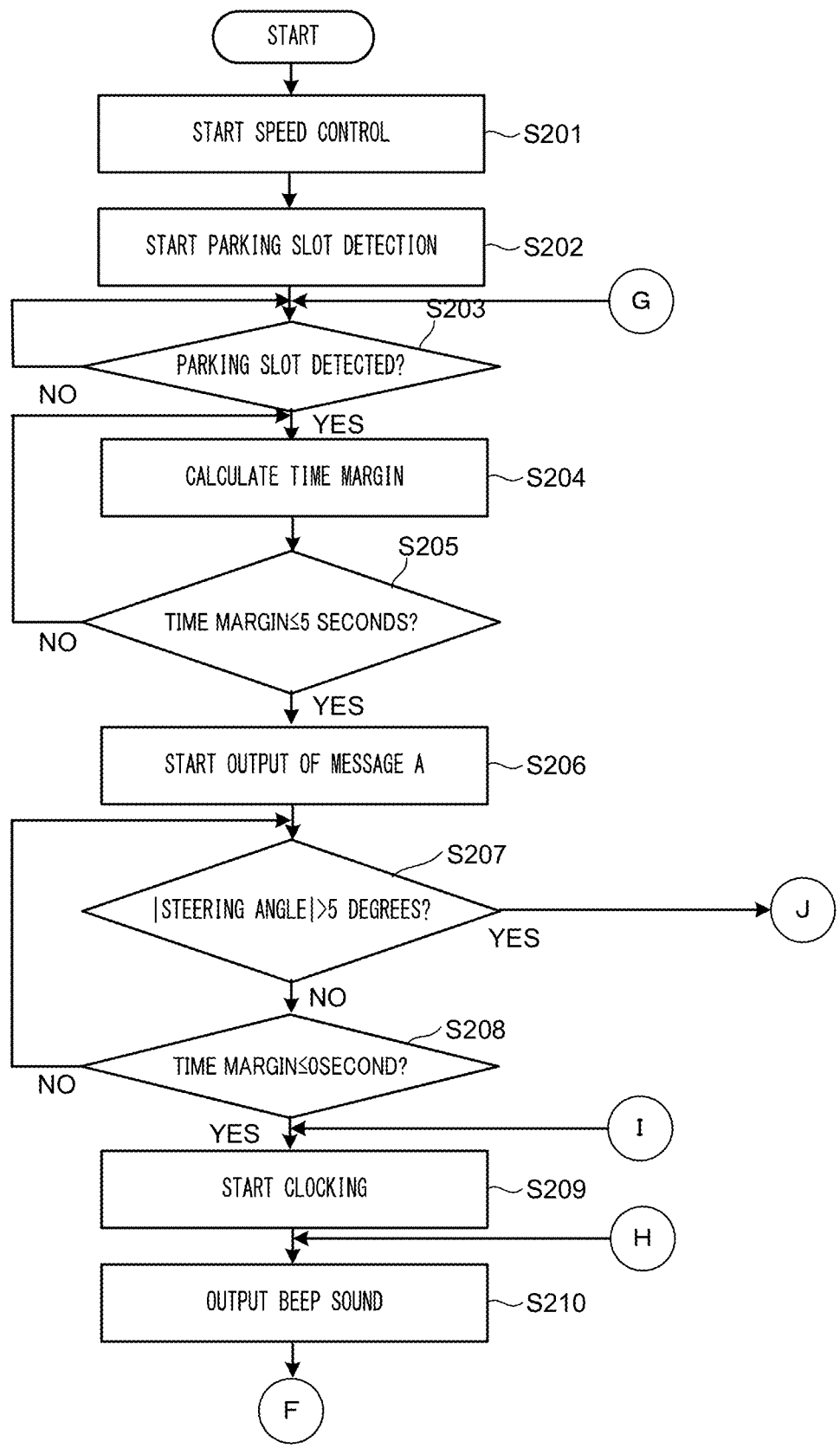
FIG. 15 is a flowchart illustrating an exemplary operation of a parking support control in a parking support apparatus according to the second embodiment.
Figure 16:
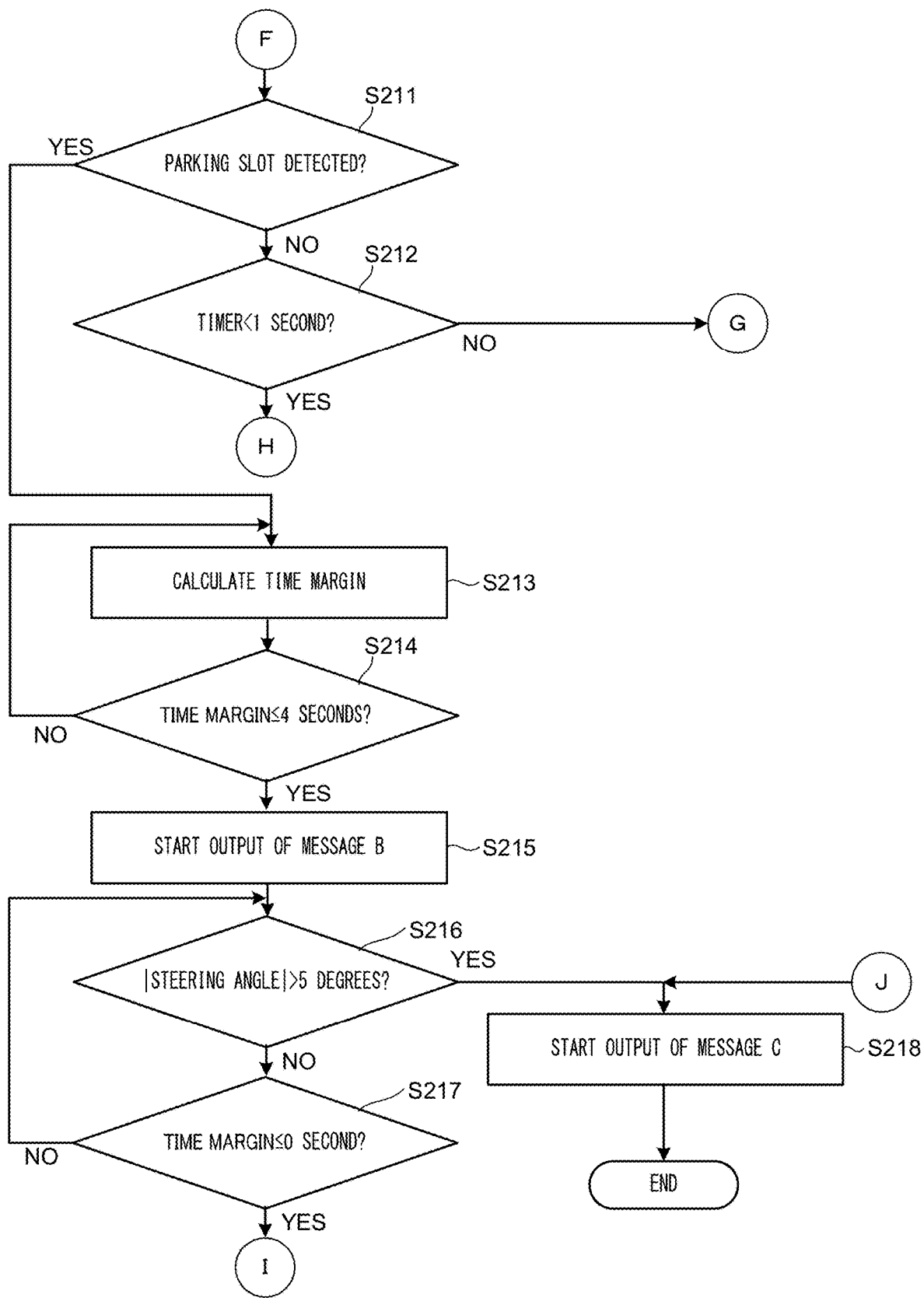
FIG. 16 is a flowchart illustrating an exemplary operation of the parking support control in the parking support apparatus according to the second embodiment.

Next, an exemplary operation of parking support apparatus 100 according to the second embodiment is described. FIGS. 15 and 16 are flowcharts illustrating an exemplary operation of a parking support control in parking support apparatus 100 according to the second embodiment. The procedure of FIG. 16 has been started when the activation button of parking support apparatus 100 is pushed. It is assumed that at the start time point, vehicle 1 is driving at a low speed on a path in a parking lot, and that the advancing direction is substantially orthogonal to the detected white line group. The following flowcharts of FIGS. 15 and 16 illustrate parts related to the notification, and omit the parts not related to the notification. Therefore, the processes illustrated in FIGS. 11 to 13 of the first embodiment may be executed in parallel to the processes of the following flowchart.

When the button for activating parking support apparatus 100 is pushed, parking support apparatus 100 starts the speed control (step S201) as illustrated in FIG. 15. This speed control is a control of suppressing the speed of vehicle 1 to increase the margin of the time for the occupant to determine the parking slot. For example, when the vehicle speed is controlled to 3 km/h, vehicle 1 passes, in three seconds, through the front side of the parking slots at an interval of 2.5 m.

Further, parking support apparatus 100 starts the parking slot detection (step S202). The parking slot detection is performed based on the image of the front camera. The speed control and the parking slot detection are not limited to the above-mentioned steps, but are continuously executed in the processes after step S202.

After step S202, parking support apparatus 100 determines whether the parking slot has detected (step S203). When it is determined that the parking slot has not been detected (step S203, NO), the process of step S203 is repeated.

On the other hand, when the parking slot has been detected (step S203, YES), parking support apparatus 100 calculates the time margin on the basis of the distance to the parking slot and the vehicle speed (step S204). The time margin is the period until vehicle 1 arrives at the guide termination point, for example. The guide termination point is a position corresponding to Q3 and Q5 of FIG. 14, and is a position where the count down of parking support apparatus 100 is completed.

After step S204, parking support apparatus 100 determines whether the time margin is not longer than 5 seconds (step S205). When it is determined that the time margin is longer than 5 seconds (step S205, NO), the process is returned to step S204.

In the case where the time margin is not longer than 5 seconds (step S205, YES), parking support apparatus 100 starts the output of message A (step S206). Specifically, message A is output after waiting until the time margin becomes 5 seconds. Message A may be a message including count down such as "park in this parking slot? 3, 2, 1", for example. In this manner, parking support apparatus 100 adjusts the time such that vehicle 1 reaches the guide termination point upon completion of the output of message A.

Next, parking support apparatus 100 determines whether the absolute value of the steering angle is greater than 5 degrees (step S207). Note that the processes of step S207 and step S208 are executed during the output of message A at step S206. That is, whether the steering wheel has been turned during the count down is determined.

When it is determined that the absolute value of the steering angle is greater than 5 degrees (step S207, YES), the process is advanced to step S218. On the other hand, when the absolute value of the steering angle is equal to or smaller than 5 degrees (step S207, NO), parking support apparatus 100 determines whether the time margin is not longer than 0 second (step S208). This time margin is the same as the number notified as message A. Specifically, whether the steering wheel has been turned before the notification of zero in the count down notification is determined. When it is determined that the time margin is longer than 0 second (step S208, NO), the process is returned to step S207. On the other hand, when the time margin is not longer than 0 second (step S208, YES), i.e., the notification of zero has been made, parking support apparatus 100 sets the timer to 0 second to start clocking (step S209). The timer counts the elapsed time after the start of the clocking.

After step S209, parking support apparatus 100 outputs a beep sound such as "boo" (step S210). The beep sound is a sound for notifying that the parking slot detected at step S203 is not set to the target parking slot because no steering operation has been detected during the guide period, and the beep sound is continued only during the execution of the process of step S210.

As illustrated in FIG. 16, after step S210, parking support apparatus 100 determines whether the parking slot has been detected (step S211). The parking slot subjected to the determination at step S211 is not the first parking slot detected at step S203, but is the next parking slot. When the parking slot detection has been continuously performed also after the detection of the parking slot at step S203 and the next parking slot has been detected, it is immediately determined to be YES at step S211. When it is determined that no parking slot has been detected (step S211, NO), parking support apparatus 100 determines whether the timer is less than one second (step S212).

When it is determined that the timer is longer than one second (step S212, NO), the process is returned to step S203. Step S203 is a step of detecting the first parking slot, and therefore when the next parking slot is not detected within one second, the status will be determined to be not a status for continuously detecting the parking slot. That is, when the next parking slot is not detected within one second, the parking slot detected next is handled as a first parking slot. On the other hand, when the timer is shorter than one second (step S212, YES), the process is returned to step S210. Step S210 is a step of a beep sound, and the beep sound will be output for up to one second.

Returning to the determination of step S211, when the next parking slot is detected (step S211, YES), parking support apparatus 100 calculates the time margin (step S213). The time margin is a period until vehicle 1 arrives at the guide termination point, for example.

After step S213, parking support apparatus 100 determines whether the time margin is not longer than four seconds (step S214). When it is determined that the time margin is longer than four seconds (step S214, NO), the process is returned to step S213.

On the other hand, when the time margin is not longer than four seconds (step S214, YES), parking support apparatus 100 starts the output of message B (step S215). That is, message B is output by waiting until the time margin becomes four seconds. The fact that the time threshold value is shorter than in step S205 corresponds to the fact that message B is a guide for the second parking slot and is therefore shorter than message A. Message B may be a message related to count down such as "park next? 3, 2, 1", for example. In addition, parking support apparatus 100 adjusts the time such that vehicle 1 reaches the guide termination point upon completion of the output of message B.

Next, parking support apparatus 100 determines whether the absolute value of the steering angle is greater than 5 degrees (step S216). Note that the processes of step S216 and step S217 are executed during the output of message B. That is, whether the steering wheel has been turned during the count down is determined.

When it is determined that the absolute value of the steering angle is equal to or smaller than 5 degrees (step S216, NO), parking support apparatus 100 determines whether the time margin is not greater than 0 second (step S217). This time margin is the same as the number notified as message A. Specifically, whether the steering wheel has been turned before the notification of zero in the count down notification is determined. When it is determined that the time margin is longer than 0 second (step S217, NO), the process is returned to step S216.

On the other hand, the time margin is not longer than 0 second (step S217, YES), the process is returned to step S209. Specifically, when a notification of zero has been made, a notification that the detected parking slot is not set as the target parking slot is made with a beep sound such as "boo".

Returning to the determination of step S216, when the absolute value of the steering angle is greater than 5 degrees (step S216, YES), the process is advanced to step S218. The same applies to the case of YES at step S207. At step S218, parking support apparatus 100 starts the output of message C (step S218). Message C is a notification of determination of the target parking slot, and may be a message such as "Automatic parking will be performed in this slot. Stop vehicle with its back to the slot", for example. After step S218, this control is completed.

According to the second embodiment with the above-mentioned configuration, even when there are continuous available parking slots, an operation of instructing the parking slot can be received such that the parking slot for vehicle 1 is not unclear.

Note that the flowcharts illustrated in FIGS. 15 and 16 are an example of a control of guiding the turning of the steering wheel at a timing when the target parking slot can be specified, and an example of a control is described below for the notification for parking to the specified parking slot. The process of the flowchart illustrated in FIG. 17 is an example of a notification control for parking, and this may be performed after step S218 of FIG. 16.

Figure 17:
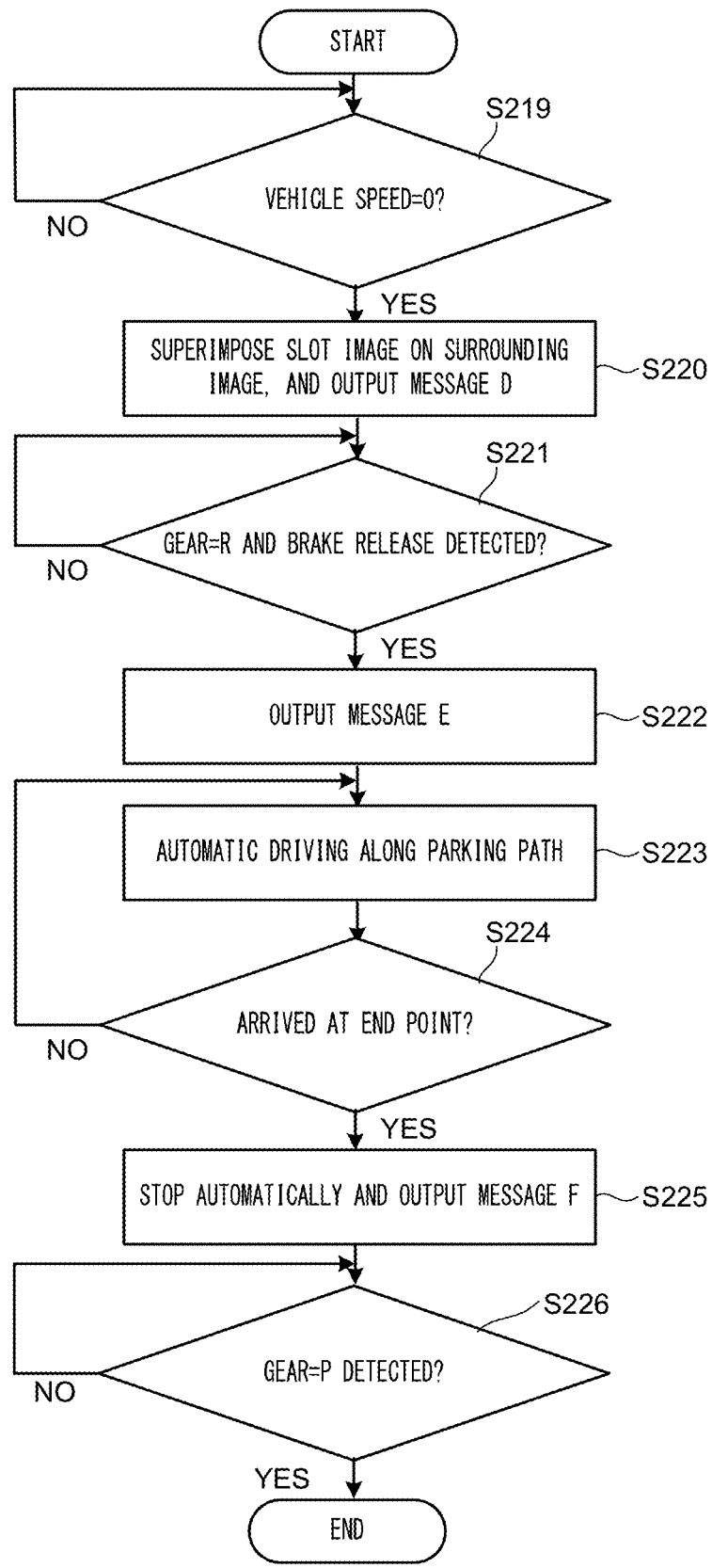
FIG. 17 is a flowchart illustrating an exemplary operation of the parking support control in the parking support apparatus according to the second embodiment.

It is assumed that the flowchart illustrated in FIG. 17 is started in the state where the occupant turns the steering wheel and the vehicle moves forward toward the backward movement start position (turning position). To detect the fact that it has reached the backward movement start position, parking support apparatus 100 determines whether the vehicle speed is 0 (step S219). When it is determined that vehicle speed is not 0 (step S219, NO), the process of step S219 is repeated.

On the other hand, when the vehicle speed is 0 (step S219, YES), the vehicle has reached the backward movement start position, parking support apparatus 100 displays the slot image on the surrounding image of vehicle 1 in a superimposed manner, and outputs message D while calculating the parking path (step S220). Message D is a confirmation request of the target parking slot, and may be a message such as "to park in parking slot, set gear to R and release brake", for example.

Next, parking support apparatus 100 determines whether a state where the gear is R and the brake is released has been detected (step S221). When it is determined that a state where the gear is R and the brake is released has not been detected (step S221, NO), the process of step S221 is repeated. That is, it waits until the occupant confirms the target parking slot.

On the other hand, a state where the gear is R and the brake is released has been detected (step S221, YES), parking support apparatus 100 outputs message E for notification of the start of the automatic parking (step S222). Message E may be a message such as "Automatic parking is starting. Please be careful around the vehicle" for example.

After step S222, parking support apparatus 100 causes vehicle 1 to perform automatic driving along the parking path (step S223).

After step S223, parking support apparatus 100 determines whether vehicle 1 has reached the end point (step S224). When it is determined that vehicle 1 has reached the end point (step S224, NO), the process is returned to step S223.

On the other hand, when vehicle 1 has reached the end point (step S224, YES), parking support apparatus 100 automatically stops vehicle 1, and outputs message F of the notification of the completion of the automatic parking (step S225). Message F may be a message such as "Automatic parking is completed. Set gear to parking", for example.

After step S225, parking support apparatus 100 determines whether the gear set to P has been detected (step S226). When it is determined that the gear set to P has not been detected (step S226, NO), the process of step S226 is repeated. On the other hand, when the gear set to P has been detected (step S226, YES), this control is completed.

Note that for the sake of clarity of the flowchart, the illustration and description of exceptional processes such as a case where the occupant does not follow the message instruction are omitted. The exceptional processes may be appropriately implemented in a supplemental manner. For example, the occupant may turn the steering wheel during a detection of a parking slot just to turn at a path, and have no intention to park in the detected parking slot. As an exceptional process for such a case, at step S219, the operation of the steering wheel may be determined to be not an operation for designating the parking slot and the process may be advanced to step S203 on condition that the vehicle speed does not become 0 even after a predetermined time.

In this manner, in the case where a plurality of parking slots, such as parking slot S1 and parking slot S2 in FIG. 10, is detected, setting errors of the target parking slot can be prevented with a support notification. However, in the case where only one parking slot has been detected as in FIG. 6, no setting error of the target parking slot occurs, and therefore the support notification may not be effective or may be bothersome for the occupant.

In view of this, in the case where there is only one detected parking slot, it is preferable to reduce the number of notifications than in the case where there is a plurality of detected parking slots. For example, in the case where there is a plurality of detected parking slots, the notification of the inquiry for the intention of parking and the time margin, such as "park in this parking slot? 3, 2, 1", is provided, whereas in the case where there is only one detected parking slot, the notification of the inquiry of the intention of parking such as "park in this parking slot?" may be provided. In addition, in the case where there is only one detected parking slot, the notification may not be provided.

Third Embodiment

A third embodiment of the present disclosure is described below. When the parking slot intended for parking can be reliably set to the target parking slot, the occupant can reduce the task of confirming the target parking slot, and the task of correcting the target parking slot. In view of this, parking support apparatus 100 may cause the occupant to perform a steering for specifying the parking slot intended for parking, and set the target parking slot on the basis of the observation and analysis of the steering action.

FIGS. 18 to 23 are diagrams for describing an example of a steering action vehicle 1 in the third embodiment.

Figure 18:
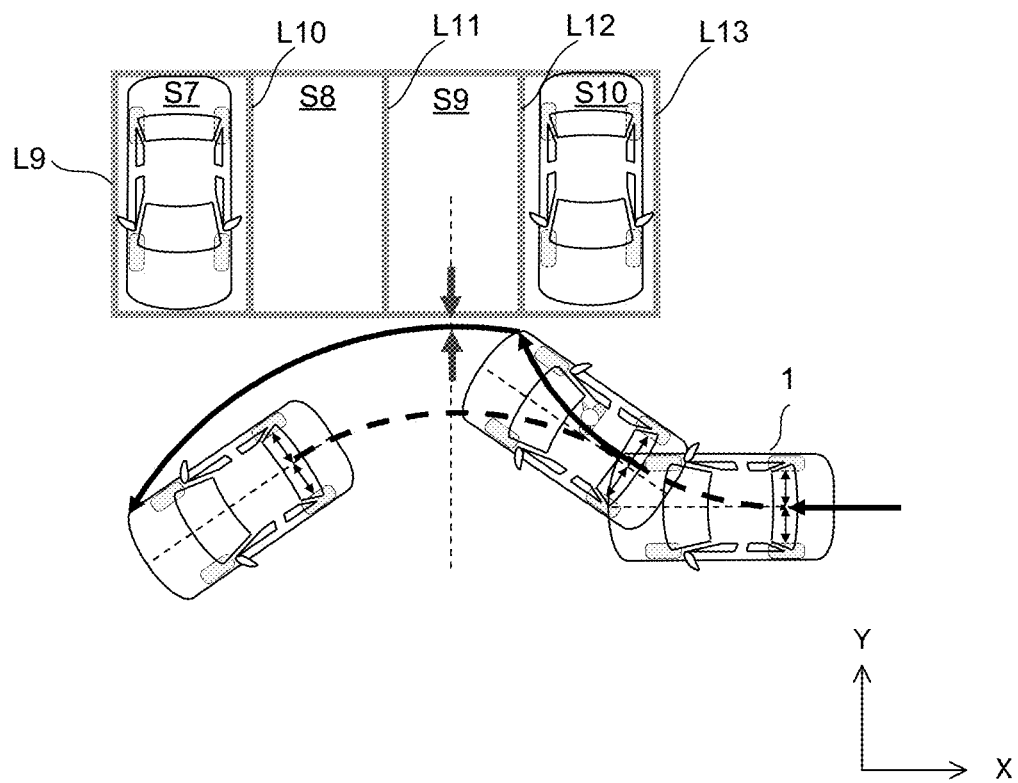
FIG. 18 is a diagram for describing an exemplary vehicle steering action in a third embodiment.

The example illustrated in FIG. 18 and the like illustrates a parking lot in which four parking slots S7, S8, S9 and S10 are disposed in this order from the −side in the X direction. Parking slot S7 is a parking slot between parking slot lines L9 and L10, parking slot S8 is a parking slot between parking slot lines L10 and L11, parking slot S9 is parking slot between parking slot lines L11 and L12, and parking slot S10 is a parking slot between parking slot lines L12 and L13. In the example illustrated in FIG. 18 and the like, available parking slots are S8 and S9, and vehicle 1 drives forward from the +side to the −side in the X direction on a path facing four parking slots S7, S8, S9 and S10 and makes a steering action to designate the parking slot intended for parking during the driving.

Parking support apparatus 100 detects the opposite turning opposite to the turning direction at the time point when the vehicle stops indicated by the history, and selects the parking slot matching the history on the basis of either of the vehicle position at the time of the start of the opposite turning, or the vehicle position or the orientation of the vehicle body at the time of the completion of the opposite turning. The opposite turning is steering of turning the front end of the vehicle body to the side opposite to the stop position, i.e., the parking slot side, and may be referred to as counter steering. For example, as illustrated in FIG. 18, the target parking slot may be set by determining the parking slot closest to a corner of the vehicle body when the occupant performs steering such that a front end corner of the vehicle body is brought closer to the parking slot intended for parking. In the example illustrated in FIG. 18, the target parking slot is set to parking slot S9, which corresponds to the position of vehicle 1 moved to the most+side in the Y direction.

Figure 19:
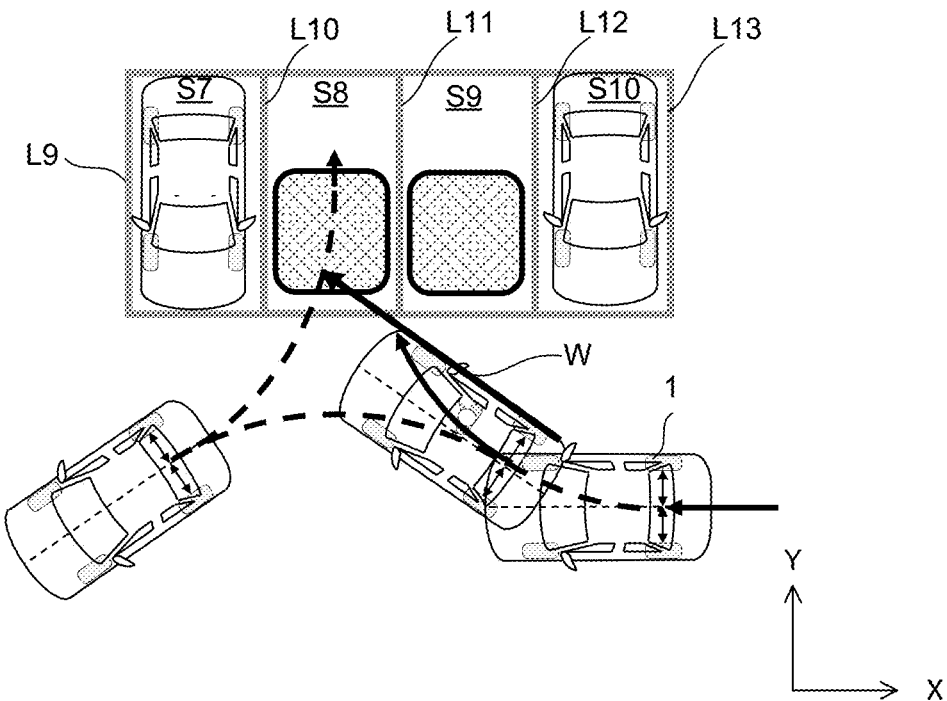
FIG. 19 is a diagram for describing an exemplary vehicle steering action in the third embodiment.

In addition, as illustrated in FIG. 19, parking support apparatus 100 may set the target parking slot by specifying the parking slot indicated by line W extended forward from the right side surface of the vehicle body, i.e., the side surface facing the parking slot when the occupant turns the steering wheel toward the stop position, for example. In the example illustrated in FIG. 19, parking slot S8 overlapping line W is set to the target parking slot.

Figure 20:
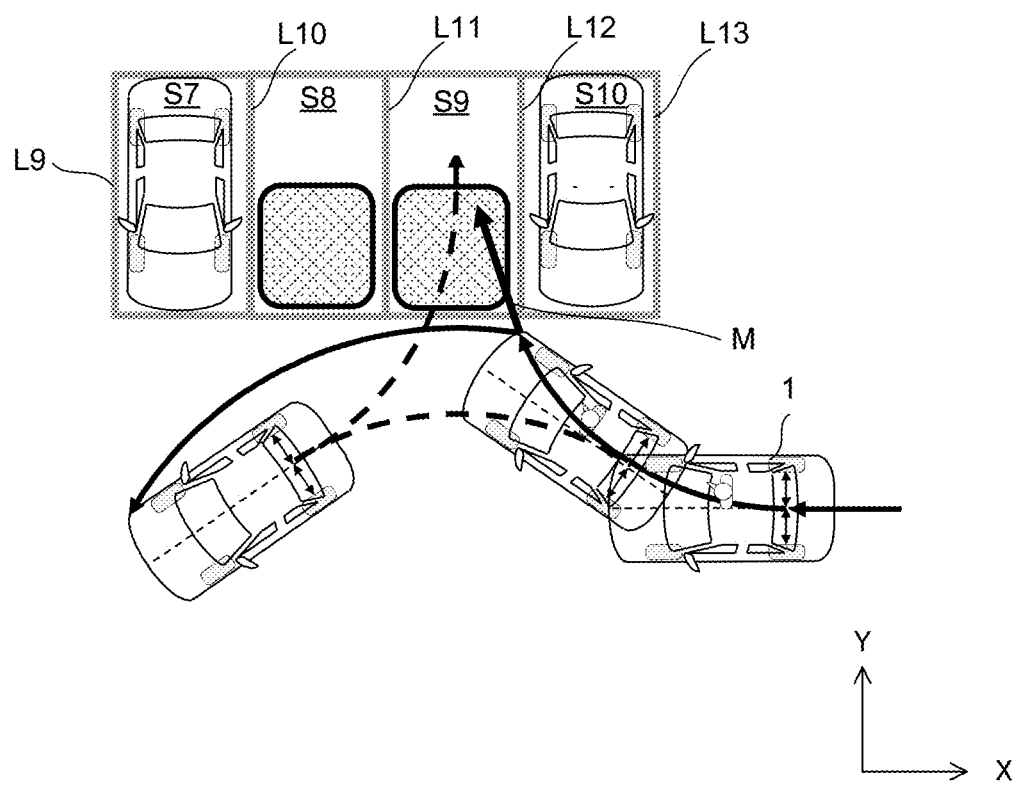
FIG. 20 is a diagram for describing an exemplary vehicle steering action in the third embodiment.

In addition, as illustrated in FIG. 20, parking support apparatus 100 may specify movement direction M of the right front corner immediately before the left-steering of vehicle 1, and set the parking slot target to the parking slot located in movement direction M (arrow M direction), for example. In the example illustrated in FIG. 20, parking slot S9 overlapping movement direction M is set to the target parking slot.

Figure 21:
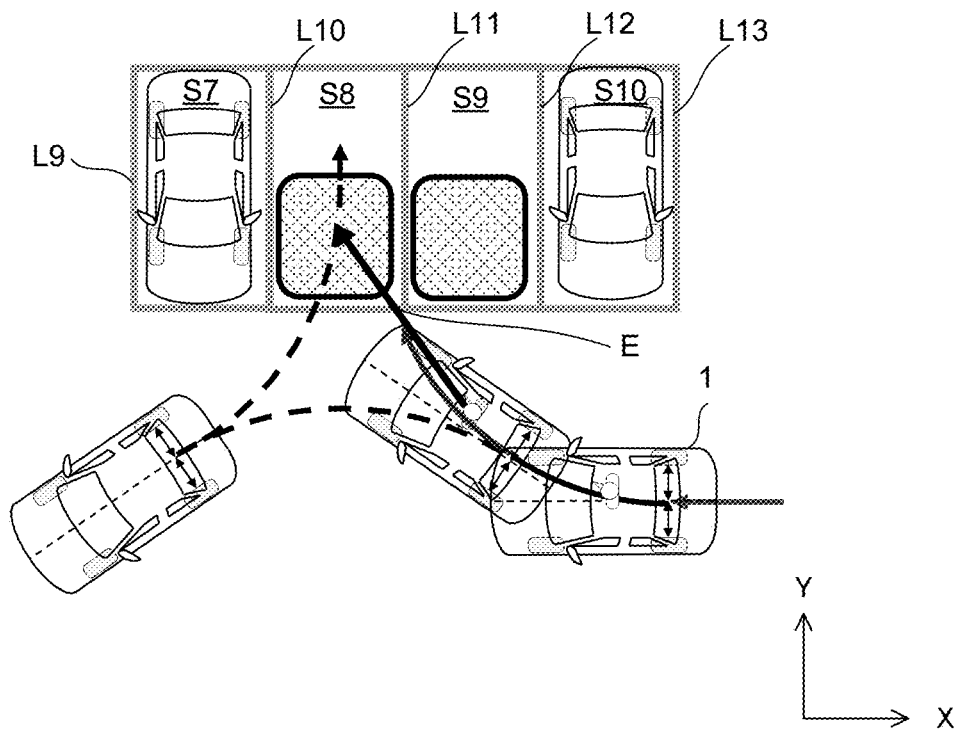
FIG. 21 is a diagram for describing an exemplary vehicle steering action in the third embodiment.

In addition, as illustrated in FIG. 21, parking support apparatus 100 may specify direction E (arrow E direction) of the right front corner as viewed from the occupant immediately before vehicle 1 steers to the left side, and set the target parking slot to the parking slot located in direction E, for example. In the example illustrated in FIG. 21, parking slot S8 overlapping direction E is set to the target parking slot. That is, the steering for designating the intended parking slot may be any of steering of turning to the side opposite to the intended parking slot at the opening of the intended parking slot, steering of temporarily turning to the intended parking slot side at the opening of the intended parking slot, steering of directing the vehicle body to the intended parking slot, and steering of approaching the vehicle body to the intended parking slot. In the case where the parking slot is specified on the basis of the orientation (direction) of the vehicle body, it may be any of the direction of the side surface on the side opposite to parking position, or the driving direction of the front end corner of the vehicle body on the side opposite to parking position, or, the direction of the front end corner on the side opposite to the parking position as viewed from the occupant.

When the parking slot is specified based on the direction, it is preferable that parking support apparatus 100 determine, as the determination portion representing the parking slot, the region from the opening of the parking slot on the path side to the center of the parking slot. The reason for this is that this determination portion is a range to which the line of sight of the occupant selecting the parking slot is directed, and the occupant operates vehicle 1 toward the determination portion during the operation toward the parking slot. For example, parking support apparatus 100 may set the center of each determination portion, and evaluate the distance between the line extending the direction and each center, so as to set the target parking slot to the parking slot with the smallest distance to the line extending the direction among the centers of the plurality of determination portions.

Figure 22:
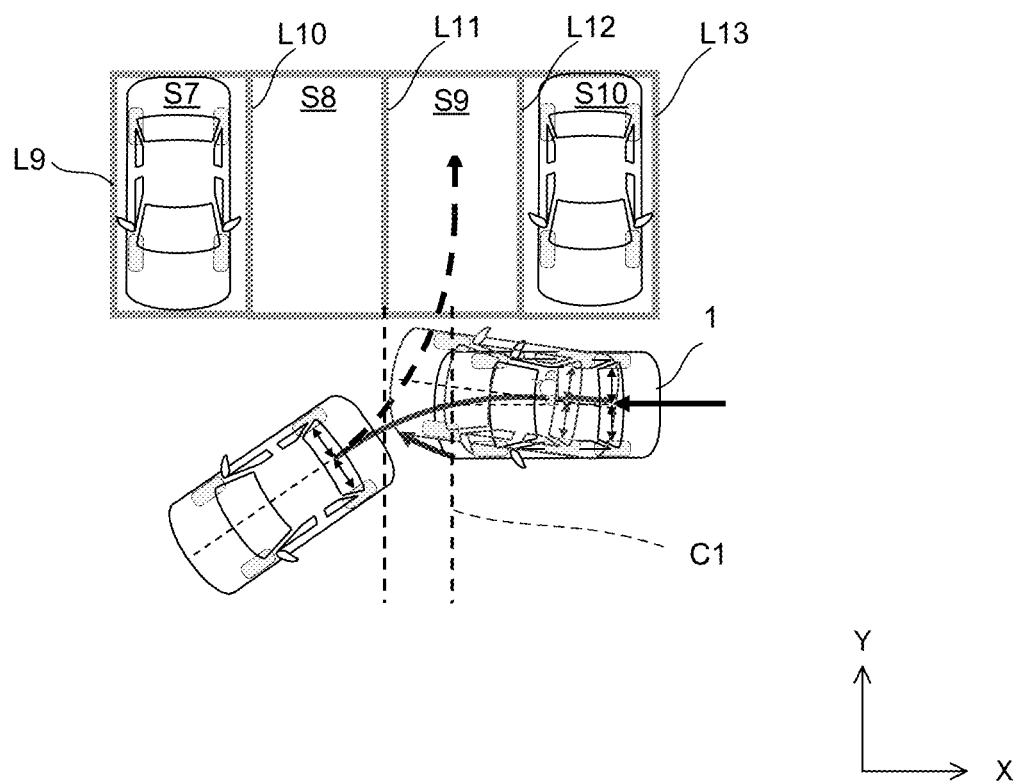
FIG. 22 is a diagram for describing an exemplary vehicle steering action in the third embodiment.
Figure 23:
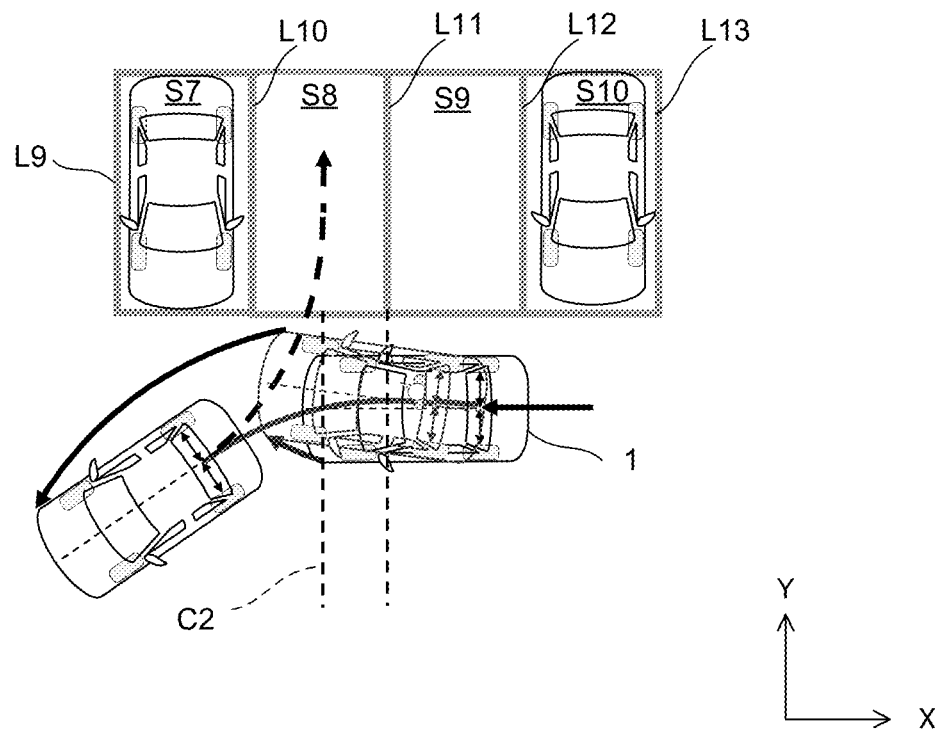
FIG. 23 is a diagram for describing an exemplary vehicle steering action in the third embodiment.

In addition, the steering for designating the parking slot intended for parking by the occupant may be a steering based on a counter steering operation as illustrated in FIGS. 22 and 23. The counter steering operation is a steering action of making a rightward trajectory by slightly steering to the right side before largely steering to the left side, for example. The counter steering can be habitual, and there are many people who unconsciously perform reverse steering. Therefore, there is no risk of being seen as an unusual behavior by others even if the occupant operates performs the counter steering operation when steering vehicle 1 for parking.

The position where the counter steering operation has been performed may be specified as the start position of the counter steering operation. For example, as illustrated in FIG. 22, when the position of the front end of the vehicle body at the time point of the start of the counter steering operation is closest to center line C1 of parking slot S9 among a plurality of parking slots, parking support apparatus 100 sets the target parking slot to parking slot S9. In addition, as illustrated in FIG. 23, when the position of the front end of the vehicle body at the time point of the start of the counter steering operation is closest to center line C2 of parking slot S8 among a plurality of parking slots, parking support apparatus 100 sets the target parking slot to parking slot S8. That is, it suffices to select the parking slot matching the history on the basis of any of the vehicle position at the start of the opposite turning, or the vehicle position or the orientation of the vehicle body at the completion of the opposite turning.

Note that in the case where a plurality of parking slots, such as parking slot S1 and parking slot S2 in FIG. 10, is detected, the steering of designating the parking slot intended for parking is effective; however, in the case where there is only one detected parking slot as in FIG. 6, the special steering is not required because the setting error of the target parking slot does not occur.

In view of this, parking support apparatuses 100 may request the steering for designating the parking slot intended for parking only in the case where a plurality of parking slots is detected, and parking support apparatuses 100 may provide no notification about steering or only a simple notification in the case where there is only one detected parking slot.

For example, in the case where there is a plurality of available parking slots on the right side of vehicle 1, parking support apparatus 100 may make an announcement of a predetermined message. The predetermined message may be any of "turn steering wheel in front of parking slot for parking", "slightly turn front end of vehicle body toward parking slot for parking", "bring corner of vehicle body closer to parking slot for parking", and "before turning front end of vehicle body to left, direct front end toward parking slot for parking", for example.

After the predetermined message, parking support apparatus 100 may make an announcement of "automatic parking will be started when stopped with its back to parking slot". In addition, in the case where there is only one detected parking slot, parking support apparatus 100 may make an announcement of "automatic parking will be started when stopped with its back to parking slot" alone without requesting the steering for designating the parking slot where the vehicle is to be parked.

In addition, even in the case where there is a plurality of available parking slots, parking support apparatus 100 does not need to repeat the notification for each parking slot. The reason for this is that when the steering of designating the intended parking slot is not performed in front of parking slot S1, there is only one candidate of the target parking slot, and therefore it is not necessary to repeat the announcement about parking slot S2, for example. For example, parking support apparatus 100 may make an announcement of "slightly turn the front end of vehicle body toward parking slot for parking" only one time when the second parking slot is detected. Then, in the case where there is no corresponding operation in front of the first parking slot S1, parking support apparatus 100 may set parking slot S2 to the target parking slot because the intention of parking can be determined even with no corresponding operation in front of the next parking slot S2.

The above-mentioned embodiments are merely examples of embodiments for implementing the present disclosure, and the technical scope of the present disclosure should not be interpreted as limited by these embodiments. In other words, the present disclosure can be implemented in various forms without deviating from its gist or main features.

While various embodiments have been described herein above, it is to be appreciated that various changes in form and detail may be made without departing from the spirit and scope of the invention (s) presently or hereafter claimed.

This application is entitled to and claims the benefit of Japanese Patent Application No. 2022-173350, filed on Oct. 28, 2022, and Japanese Patent Application No. 2023-122398, filed on Jul. 27, 2023, the disclosure of which including the specification, drawings and abstract is incorporated herein by reference in its entirety.

INDUSTRIAL APPLICABILITY

The apparatus of the present disclosure is useful as a parking support apparatus and a parking support method that can smoothly perform automatic parking in a short time.

The invention claimed is:

1. A parking support apparatus comprising:
a processor configured to detect a parking slot based on a surrounding image indicating surroundings of a vehicle; and
a storage section configured to store a history of either an operation of an occupant of the vehicle or a motion of the vehicle,
wherein the processor detects a parking instruction of the occupant based on the history,
wherein the processor performs automatic parking of the vehicle after the parking instruction is detected, and
wherein when the history indicates that the vehicle has stopped after steering and turning from a straight movement, and that the occupant has performed a predetermined parking instruction operation, the processor determines that the parking instruction is detected.

2. The parking support apparatus according to claim 1, wherein the predetermined parking instruction operation includes at least one of a change of a gear position, a release of a steering wheel, a release of a brake, turning on of a hazard lamp, and an operation of a button corresponding to the parking instruction.

3. The parking support apparatus according to claim 1,
wherein the processor determines whether a scene is a parking scene where the vehicle performs parking,
wherein when the scene is not the parking scene, the processor limits a function of the parking support apparatus, and
wherein a function limitation applied by the processor is at least one of a limitation of a parking slot detection by the parking slot detection section when the scene is not the parking scene, and
a limitation of storing of the history by the storage section when the scene is not the parking scene.

4. The parking support apparatus according to claim 3, wherein the processor does not limit a detection of a white line when the vehicle is located outside a road and a vehicle speed is equal to or lower than a prescribed value.

5. The parking support apparatus according to claim 3, wherein the processor determines that the scene is the parking scene when any of the following conditions are satisfied:
a condition that the vehicle is located outside a road and that a vehicle speed is equal to or lower than a prescribed value, and
a condition that a plurality of white lines of which an angle with respect to a driving direction of the vehicle is within a predetermined range is detected.

6. The parking support apparatus according to claim 1,
wherein the processor calculates a path of the automatic parking,
wherein the parking instruction includes an instruction of a target parking slot for parking the vehicle,
wherein among detected parking slots, the processor selects, as the target parking slot, a parking slot matching the history and located on a side opposite to a stop position of the vehicle with respect to an advancing direction of a straight movement of the vehicle, and
wherein the processor calculates the path based on information about the target parking slot.

7. The parking support apparatus according to claim 6, wherein the processor selects the parking slot matching the history based on a position of the vehicle or the occupant at a time point of turning from a straight movement indicated by the history.

8. The parking support apparatus according to claim 7, wherein the position of the occupant is a position of a head of the occupant.

9. The parking support apparatus according to claim 4, wherein the processor detects an opposite turning in 6n opposite direction opposite to a turning direction at a time point of a stop of the vehicle indicated by the history, and wherein the processor selects the parking slot matching the history based on either:
a position of the vehicle at a time when the opposite turning is started, or
a position of the vehicle or an orientation of a vehicle body at a time when the opposite turning is completed.

10. The parking support apparatus according to claim 9, wherein the orientation of the vehicle body is either of:
a direction of a side surface of the vehicle body on the opposite direction side,
a driving direction of a front end corner of the vehicle body on the opposite direction side, or
a direction of the front end corner of the vehicle body on the opposite direction side as viewed by the occupant.

11. The parking support apparatus according to claim 6, wherein the storage section stores either the surrounding image captured during driving of the vehicle, or information about a parking slot detected during the driving of the vehicle, and
wherein the processor selects the target parking slot from the information about the detected parking slot, or the information about the parking slot detected during the driving of the vehicle stored in the storage section based on the surrounding image captured during the driving of the vehicle stored in the storage section.

12. The parking support apparatus according to claim 11, wherein the processor performs a parking slot detection based on the surrounding image captured when the vehicle stops, and
wherein when a parking slot based on the surrounding image captured when the vehicle stops is detected, the processor selects the target parking slot from information about the parking slot based on the surrounding image captured when the vehicle stops.

13. The parking support apparatus according to claim 1, wherein when it is determined that the parking instruction is detected, the processor outputs a command of turning on a hazard lamp.

14. The parking support apparatus according to claim 1, wherein the processor provides a notification to the occupant of the vehicle, and
wherein the notification includes a notification of information about a detected parking slot.

15. The parking support apparatus according to claim 14, wherein the notification includes an inquiry about an intention of parking in the parking slot, and
wherein the notification is provided when the parking slot and a vehicle body has a predetermined positional relationship.

16. The parking support apparatus according to claim 14, wherein the notification includes a notification of a timing for steering the vehicle.

17. The parking support apparatus according to claim 14, wherein the notification includes a notification of requesting a steering for designating an intended parking slot intended for parking.

18. The parking support apparatus according to claim 17, wherein the steering for designating the intended parking slot includes any of:
steering of turning to a side opposite to the intended parking slot at an opening of the intended parking slot,
steering of temporarily turning to the intended parking slot side at the opening of the intended parking slot,
steering of directing a vehicle body toward the intended parking slot, and
steering of approaching the vehicle body toward the intended parking slot.

19. The parking support apparatus according to claim 14, wherein when one parking slot is detected, the processor reduces the notification than when a plurality of parking slots is detected.

20. A parking support method comprising: detecting a parking slot based on a surrounding image indicating surroundings of a vehicle;
storing a history of either an operation of an occupant of the vehicle or a motion of the vehicle;
detecting a parking instruction of the occupant based on the history;
performing automatic parking of the vehicle after the parking instruction is detected, and
determining that the parking instruction is detected when the history indicates that the vehicle has stopped after steering and turning from a straight movement, and that the occupant has performed a predetermined parking instruction operation in the detecting the parking instruction.

* * * * *